(12) United States Patent
Grumberg et al.

(10) Patent No.: US 10,352,065 B2
(45) Date of Patent: Jul. 16, 2019

(54) CLAMP FOR TEMPORARY STRUCTURE SHEETING AND RELATED METHODS

(71) Applicant: Safway Services, LLC, Waukesha, WI (US)

(72) Inventors: Mathieu Grumberg, Delmar, NY (US); Frederick Warren Meade, North Creek, NY (US); Roy Scrafford, Scotia, NY (US)

(73) Assignee: BrandSafway Services LLC, Kennesaw, GA (US)

( * ) Notice: Subject to any disclaimer, the term of this patent is extended or adjusted under 35 U.S.C. 154(b) by 0 days.

(21) Appl. No.: 14/854,989

(22) Filed: Sep. 15, 2015

(65) Prior Publication Data
US 2017/0073995 A1    Mar. 16, 2017

(51) Int. Cl.
*F16B 5/06*    (2006.01)
*E04H 15/64*    (2006.01)
*E04H 15/18*    (2006.01)

(52) U.S. Cl.
CPC .......... *E04H 15/648* (2013.01); *E04H 15/18* (2013.01); *E04H 15/644* (2013.01); *E04H 15/646* (2013.01); *F16B 5/0692* (2013.01)

(58) Field of Classification Search
CPC .......... E04B 2002/7479; E04F 13/005; E04H 15/648; E04H 15/18; E04H 15/644; E04H 15/646; F16B 5/0692; F16B 2/02; F16B 2/06; F16B 2/065; F16B 2/12
USPC ............ 160/399, 368.1, 398, 402, 328, 378, 160/349.1, 327, 329; 40/603, 658, 648, 40/666, 617, 604; 38/102.91; 403/391, 403/396; 52/63, 222, DIG. 12; 135/115, 135/119; 248/74.4, 316.6, 229.14, 248/229.24, 230.5, 305, 230.1, 316.1, 248/301, 304, 322, 306; 211/70.1
See application file for complete search history.

(56) References Cited

U.S. PATENT DOCUMENTS

| 392,431 | A | * | 11/1888 | Higgins | ................ B62B 3/1408 |
| | | | | | 248/229.24 |
| 394,884 | A | * | 12/1888 | Roeder | .................... E04G 21/30 |
| | | | | | 160/368.1 |
| 632,858 | A | * | 9/1899 | Waibel et al. | ............. B62J 6/02 |
| | | | | | 224/420 |
| 1,493,189 | A | * | 5/1924 | Carmeroto | .............. F24B 15/00 |
| | | | | | 211/107 |
| 2,452,406 | A | * | 10/1948 | Volkery | ................. A01K 75/04 |
| | | | | | 24/329 |
| 2,472,058 | A | * | 6/1949 | Artley | ...................... A47K 1/09 |
| | | | | | 211/119.009 |

(Continued)

*Primary Examiner* — Ingrid M Weinhold
(74) *Attorney, Agent, or Firm* — Husch Blackwell LLP

(57) ABSTRACT

A sheeting clamp for a temporary structure includes a first clamping plate and a second clamping plate. The first clamping plate has a first channel parallel and a second channel. The second channel has a plurality of openings therein. The first plate also includes a first plurality of apertures proximal to the first channel and a second plurality of apertures proximal to the second channel. The second clamping plate has a first channel corresponding to the first channel of the first clamping plate, and a first plurality of apertures corresponding to the first plurality of apertures of the first clamping plate. At least one securing structure secures the first clamping plate and second clamping plate around a tubular structure around which a sheet is wrapped.

20 Claims, 21 Drawing Sheets

(56) References Cited

U.S. PATENT DOCUMENTS

| | | | | |
|---|---|---|---|---|
| 2,523,785 A * | 9/1950 | Sereno | A63H 33/102 | 248/229.26 |
| 2,631,076 A * | 3/1953 | Redlich | F16B 12/48 | 248/188 |
| 2,720,885 A | 10/1955 | Legg | | |
| 2,802,478 A | 8/1957 | Fritsche | | |
| 2,869,561 A * | 1/1959 | Harkness | E04H 15/36 | 135/115 |
| 2,950,727 A * | 8/1960 | Dunn | E04F 10/02 | 135/119 |
| 3,121,470 A | 2/1964 | Stone et al. | | |
| 3,240,217 A | 3/1966 | Bird et al. | | |
| 3,564,784 A * | 2/1971 | Mollinger | E04B 7/14 | 135/119 |
| 3,805,816 A * | 4/1974 | Nolte | B66C 1/10 | 135/115 |
| 3,830,033 A * | 8/1974 | Gahler | A01G 9/1407 | 160/391 |
| 3,875,623 A * | 4/1975 | Johnston | A41F 1/00 | 160/392 |
| 3,968,609 A * | 7/1976 | Deutsch | E04B 7/102 | 52/204.597 |
| 3,982,361 A * | 9/1976 | Deutsch | E04D 5/14 | 52/222 |
| 3,985,411 A * | 10/1976 | Mooney | H01R 4/643 | 439/100 |
| 4,097,169 A * | 6/1978 | Kelly | F16B 2/10 | 135/119 |
| 4,118,904 A * | 10/1978 | Sprung | E04H 15/18 | 135/119 |
| 4,137,687 A * | 2/1979 | Sprung | E04H 15/32 | 52/222 |
| 4,733,988 A * | 3/1988 | Kelly | F16B 2/10 | 24/327 |
| 4,763,452 A * | 8/1988 | Harvey | E04D 11/02 | 160/395 |
| 5,046,545 A * | 9/1991 | Loomis | B44D 3/185 | 160/328 |
| 5,315,736 A * | 5/1994 | Nilsson | B60J 7/104 | 135/119 |
| 5,373,653 A * | 12/1994 | Suzuki | G09F 7/18 | 160/368.1 |
| 5,408,770 A * | 4/1995 | Suzuki | E04G 5/12 | 160/368.1 |
| 5,593,205 A * | 1/1997 | Vanderminden, Sr. | A47C 7/66 | 135/96 |
| 5,626,244 A * | 5/1997 | Mesna | A47F 5/083 | 211/60.1 |
| 5,632,633 A * | 5/1997 | Roosdorp | H01R 4/646 | 439/100 |
| 5,765,962 A * | 6/1998 | Cornell | H01R 4/40 | 403/396 |
| 5,953,875 A * | 9/1999 | Harkins | E04B 1/62 | 160/392 |
| 6,145,526 A * | 11/2000 | Quiring | E04H 15/18 | 135/115 |
| 6,339,889 B1 * | 1/2002 | Griesemer | G09F 15/0025 | 160/378 |
| 6,494,327 B2 * | 12/2002 | Huang | A47F 5/0892 | 211/107 |
| 6,904,720 B1 | 6/2005 | Adolfson et al. | | |
| 7,392,620 B1 * | 7/2008 | Watson, Jr. | E04H 9/14 | 52/23 |
| 7,406,802 B2 * | 8/2008 | Stackenwalt | E04B 9/0414 | 52/22 |
| 7,641,356 B2 * | 1/2010 | Pieroth | F21L 15/10 | 248/214 |
| 7,654,045 B2 * | 2/2010 | Wiegel | E06B 9/06 | 160/352 |
| 7,789,248 B1 * | 9/2010 | Salerno | A47G 25/08 | 211/85.7 |
| 7,827,716 B2 * | 11/2010 | Smith | G09F 15/0025 | 40/590 |
| 8,028,381 B2 * | 10/2011 | Murray | A47H 23/01 | 160/395 |
| 8,043,022 B2 * | 10/2011 | Chau | E04G 5/12 | 403/338 |
| 8,959,854 B1 * | 2/2015 | Bucklin | E04H 15/644 | 160/380 |
| 9,174,518 B2 * | 11/2015 | Wilson | B60J 7/104 | |
| 9,267,517 B2 * | 2/2016 | Wilson | B60J 7/104 | |
| 9,334,644 B2 * | 5/2016 | Harnois | E04H 15/644 | |
| 9,834,960 B2 * | 12/2017 | Chesterton | E05B 73/0094 | |
| 2004/0182022 A1 * | 9/2004 | Stackenwalt | E04B 9/0414 | 52/222 |
| 2007/0000183 A1 * | 1/2007 | Logan | E02D 5/803 | 52/3 |
| 2007/0210021 A1 * | 9/2007 | Whitehead | B25H 3/04 | 211/70.6 |
| 2008/0017331 A1 * | 1/2008 | Miles | B44D 3/185 | 160/328 |
| 2010/0037544 A1 * | 2/2010 | Musgrave | E04H 15/18 | 52/222 |
| 2013/0105653 A1 * | 5/2013 | Borys | F16B 45/00 | 248/304 |

\* cited by examiner

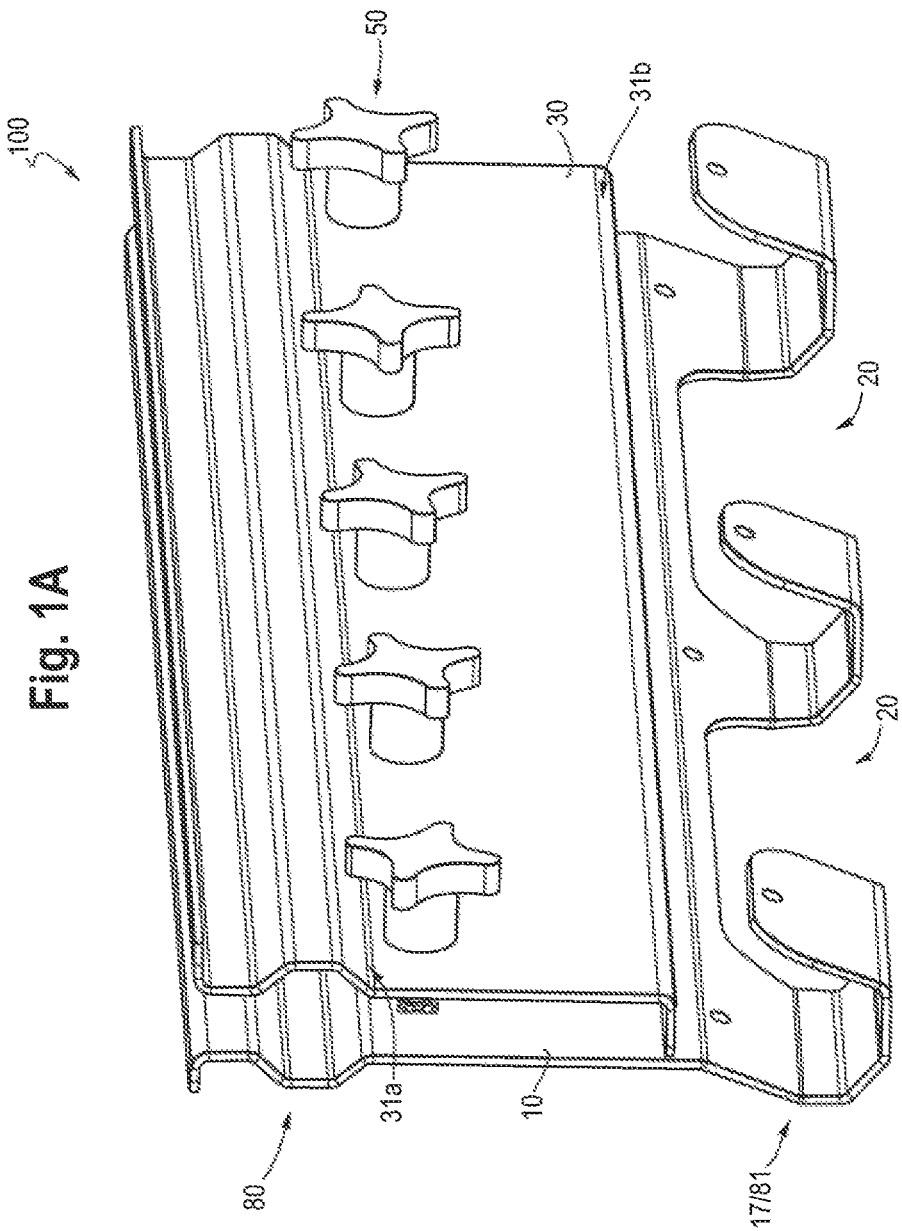

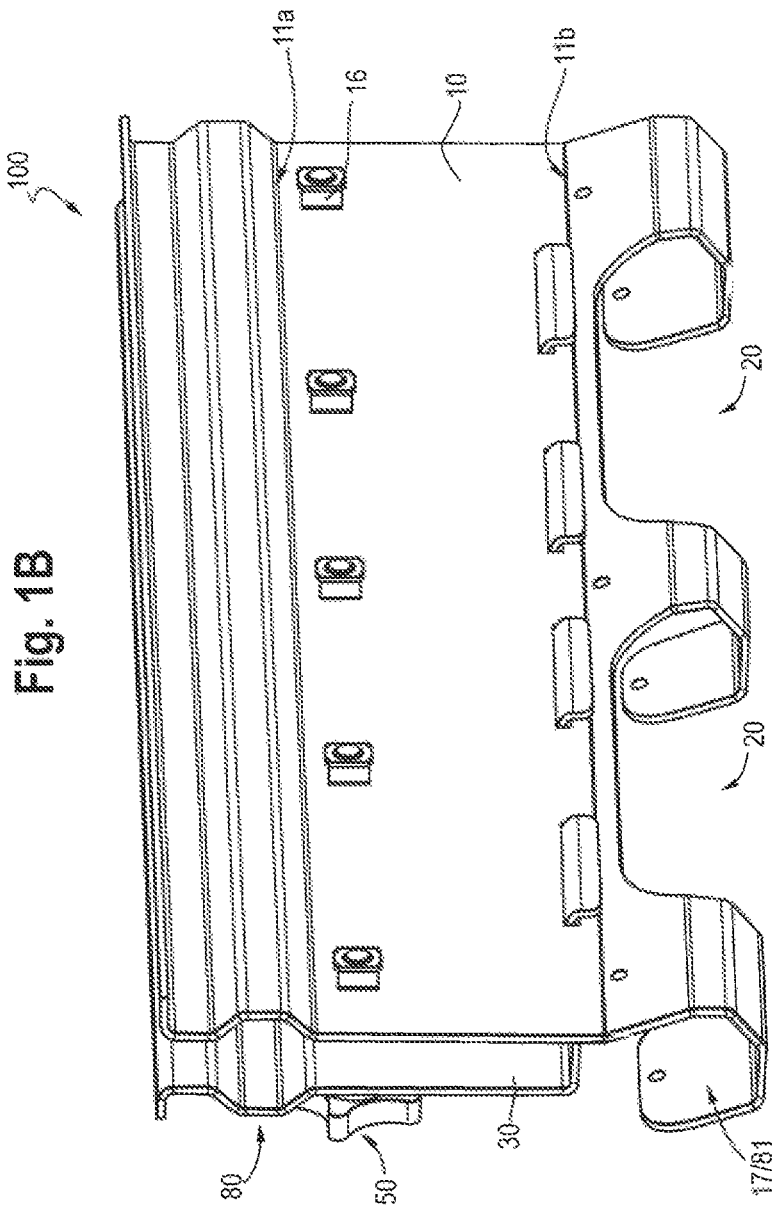

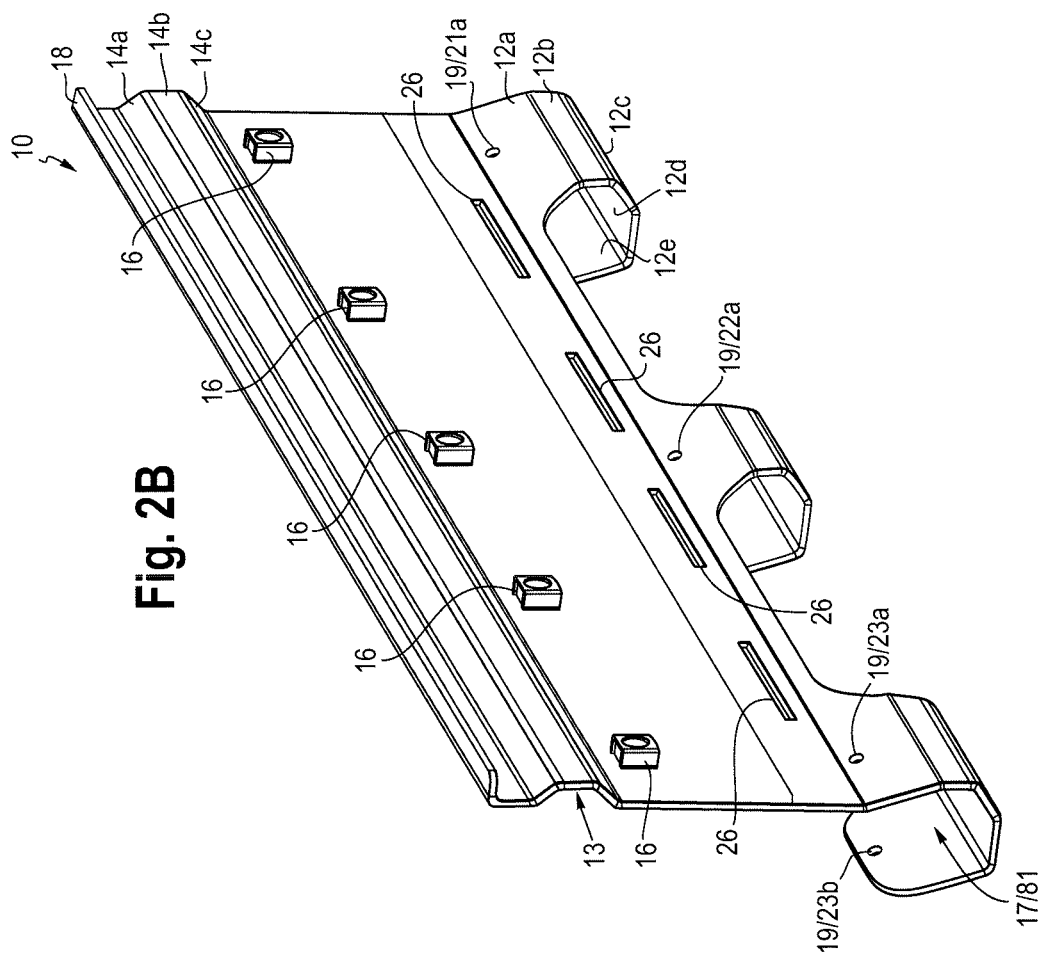

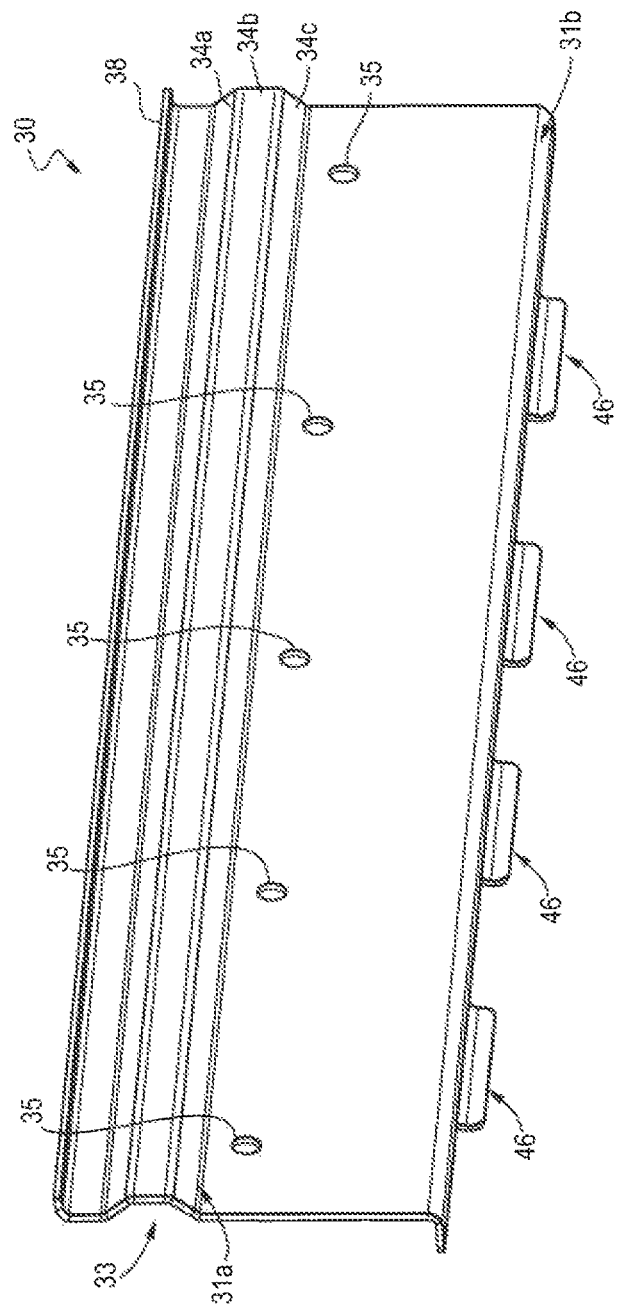

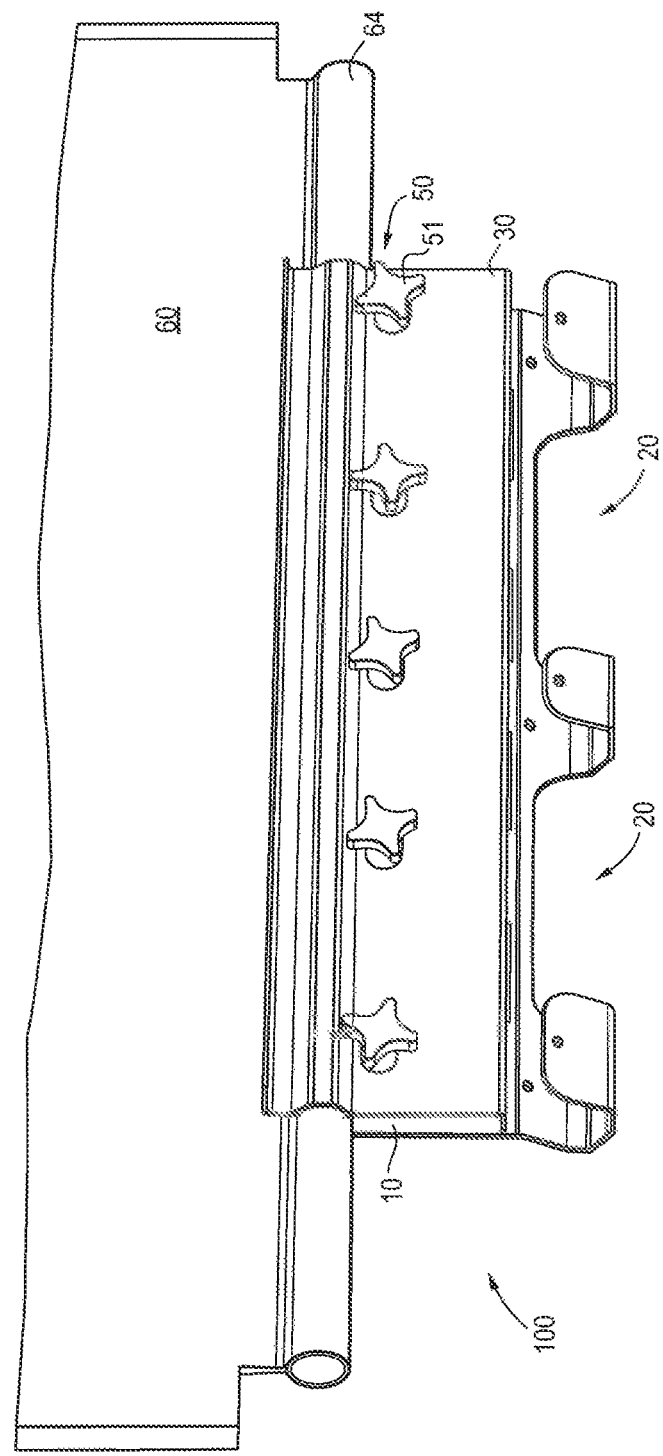

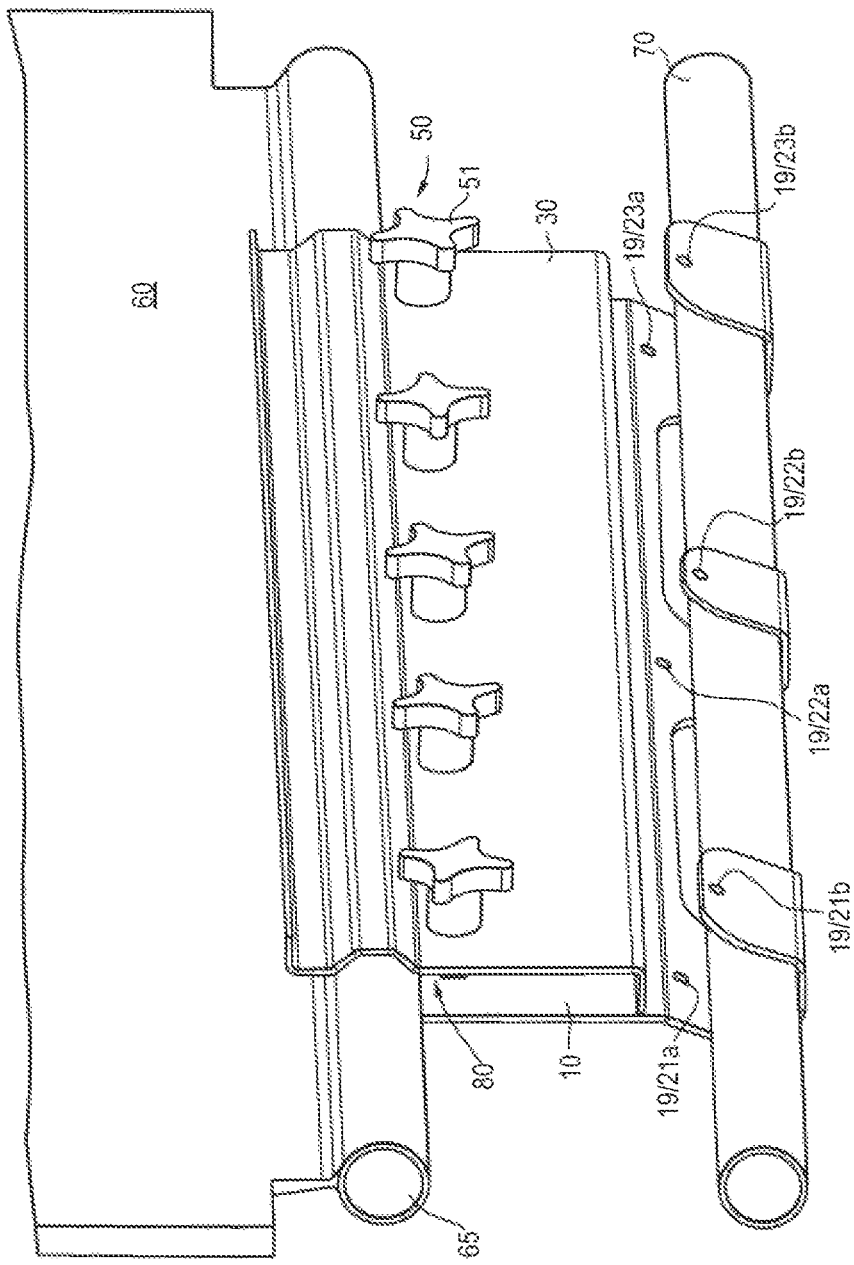

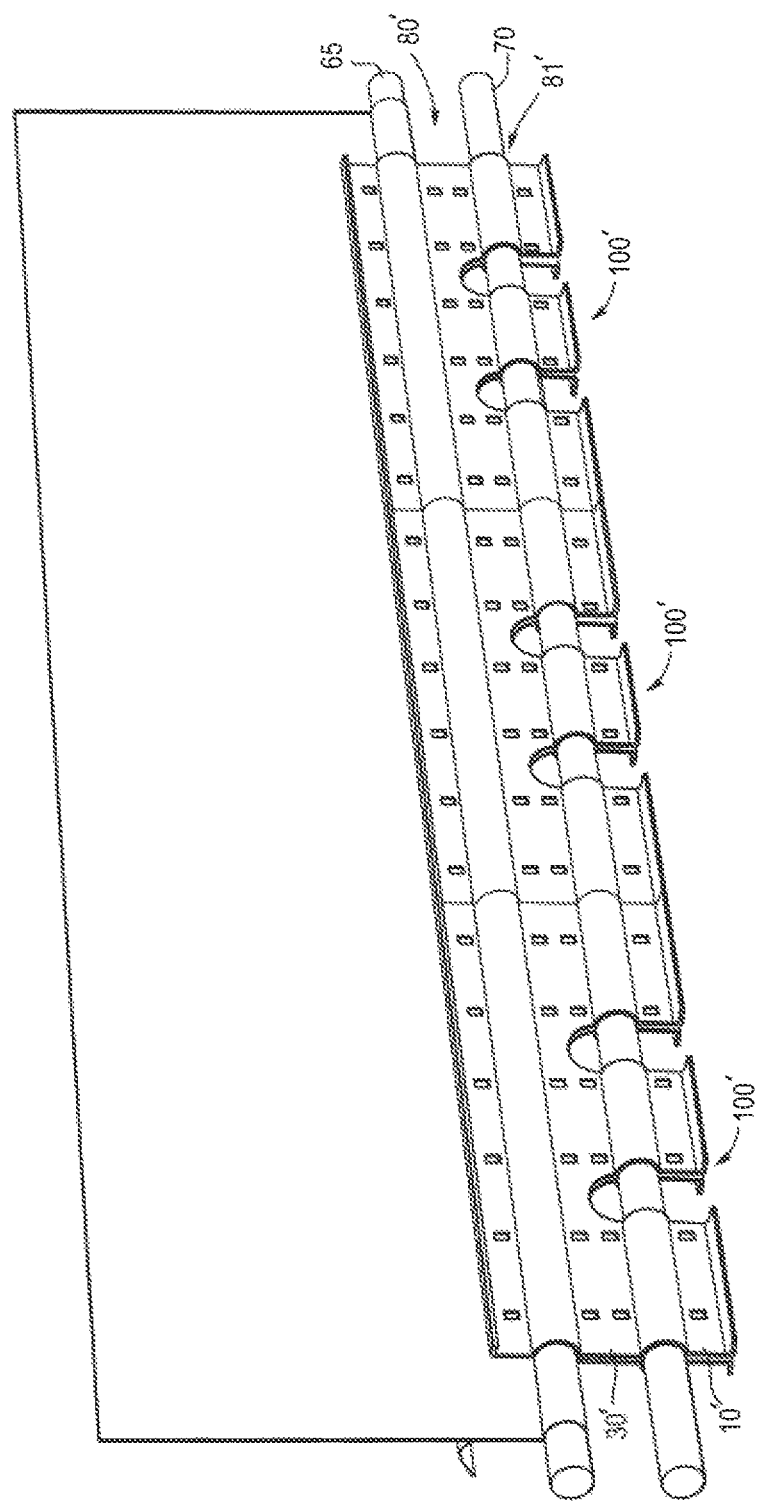

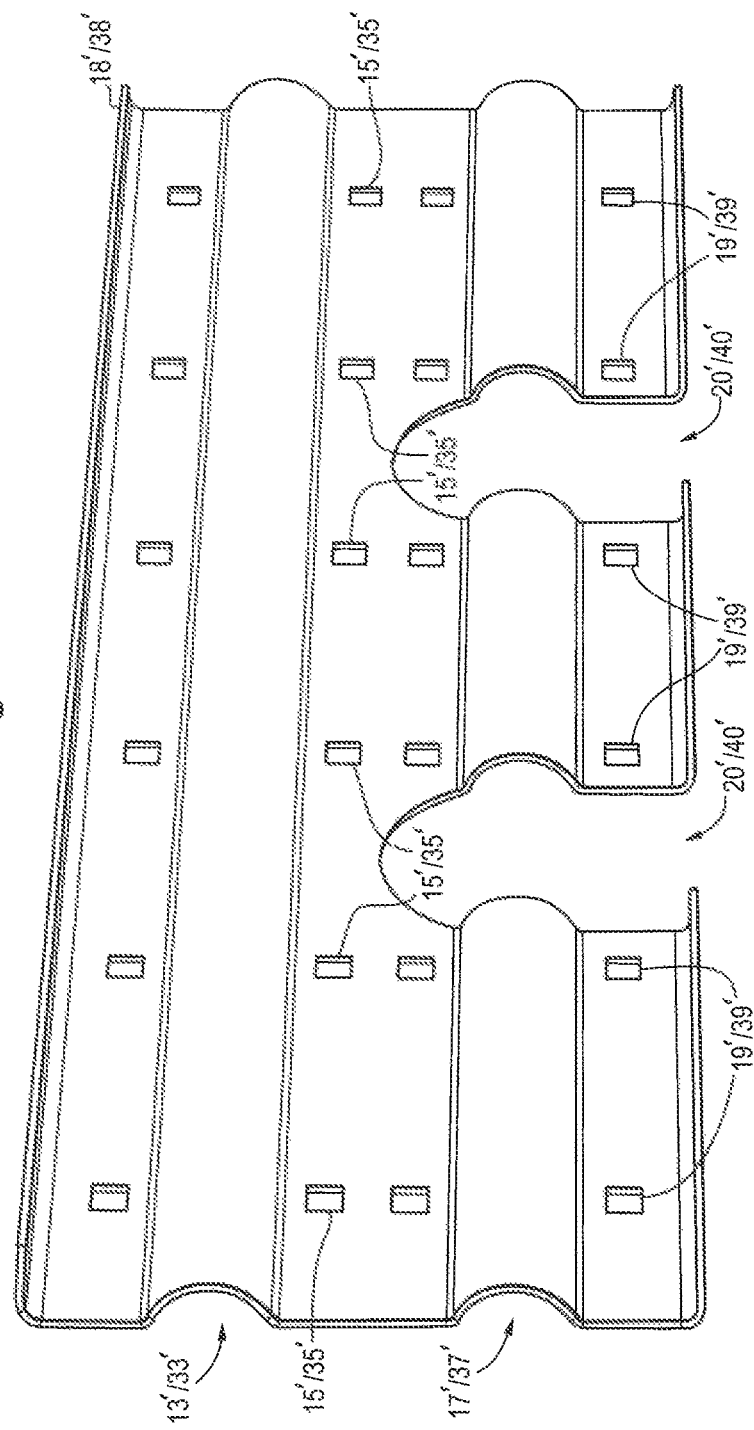

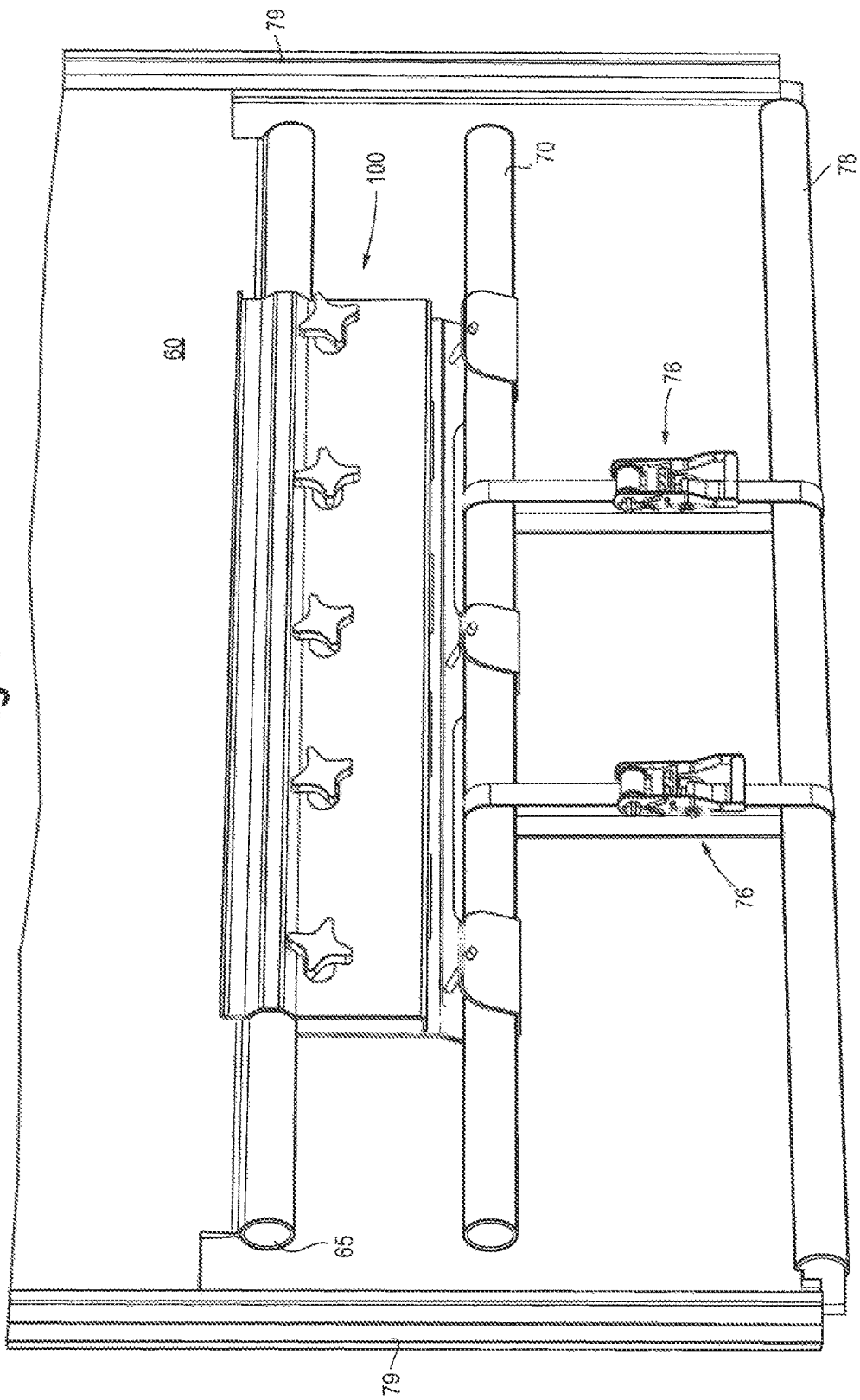

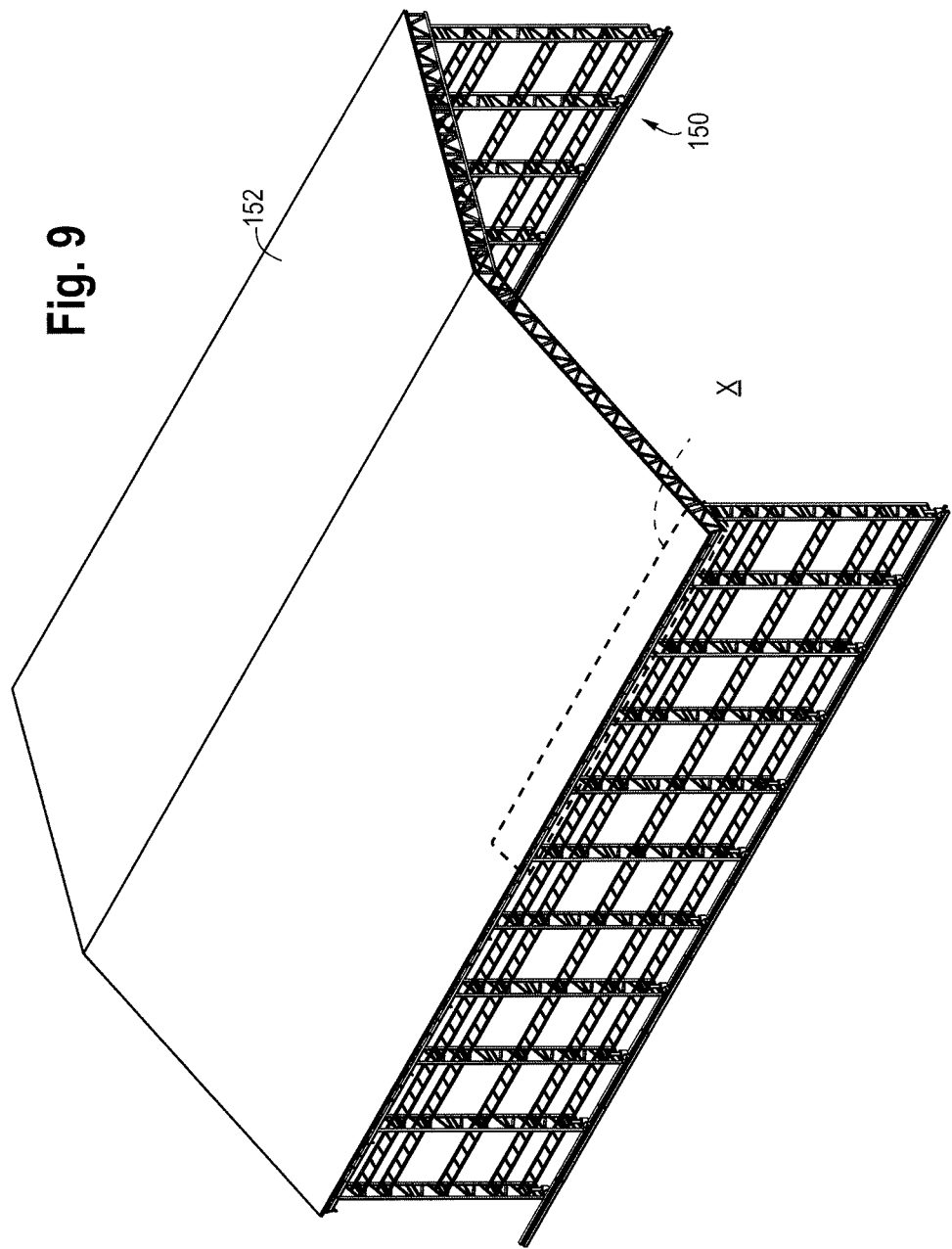

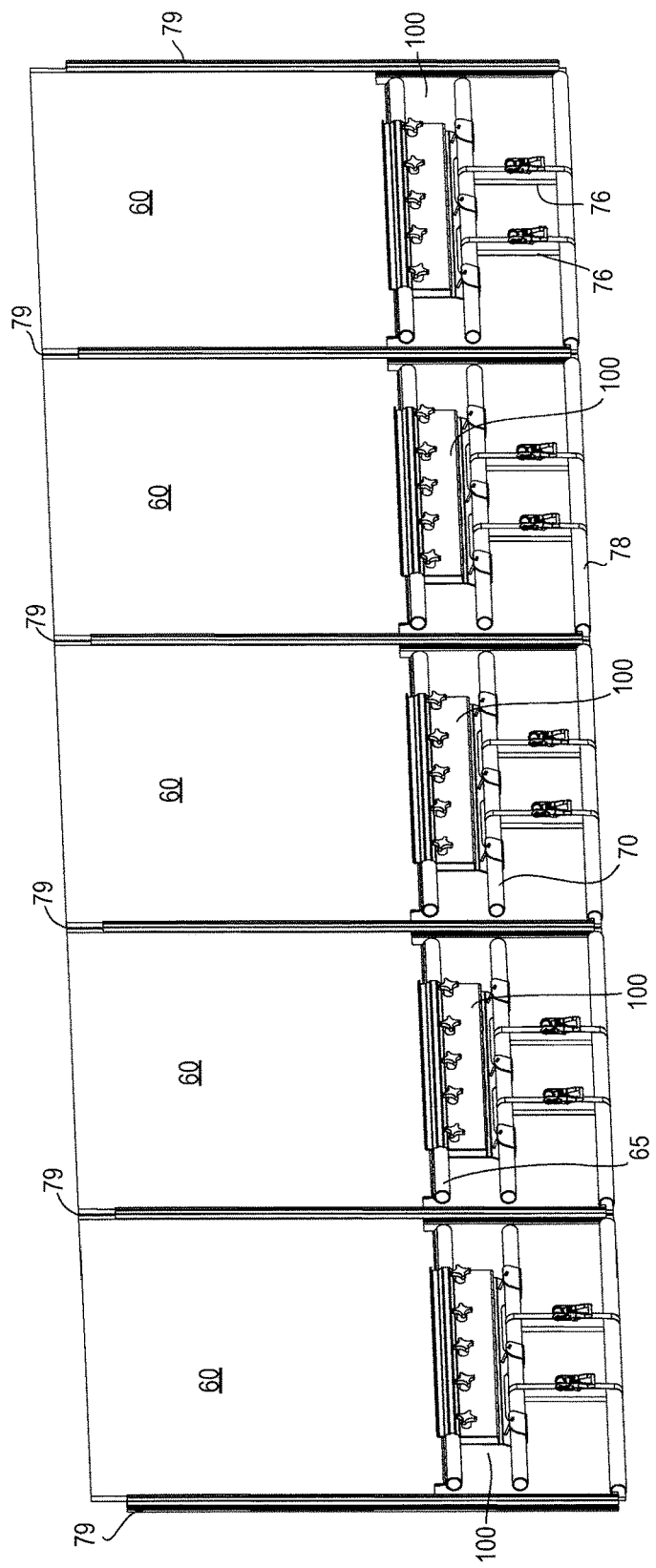

US 10,352,065 B2

CLAMP FOR TEMPORARY STRUCTURE SHEETING AND RELATED METHODS

FIELD OF THE INVENTION

The present invention relates, generally, to the field of temporary structures. More particularly, the present invention relates to clamps for sheeting material used as roofing for temporary structure.

BACKGROUND OF THE INVENTION

Temporary structures typically use fabric panels as roofing or walls to provide a wind and weather enclosure. These fabric panels have fiber ropes sown onto the edges of the panel and can be purchased under the trade name "Keder Panel." The edges of the fabric panels with the ropes sewn in are inserted into open, circular grooves in channels designed to secure and support the panels.

One challenge with typical fabric panels is securing and tensioning the loose ends of the fabric panels. Typically, the fabric panels are specifically manufactured for a given application. For example, at least in some applications, the fabric panels are manufactured to a specific length and a specific width to match the dimensions of a temporary structure. When setting up a job site with a temporary structure, an engineer must therefore create a drawing of the structure and a manufacturer must cut the panels to the specified length and weld on the pockets for receiving a structural member of the temporary structure to secure the panel to the structure.

The process of designing panels, cutting panels to length and welding pockets increases lead time and cost for each project.

For at least these reasons, therefore, it would be advantageous if a new or improved structure, system and/or method for securing fabric panels to a temporary structure and/or using bulk panels could be developed that addressed one or more of the above-described concerns, and/or other concerns.

SUMMARY OF THE INVENTION

In an embodiment, a temporary structure sheet clamp comprising a first clamping plate and a second clamping plate is provided. The first clamping plate has a length and a pair of opposed edges corresponding to the length and comprises a first channel approximately parallel with the pair of opposed edges and proximal to a first of the opposed edges, a second channel approximately parallel with the pair of opposed edges and proximal to a second of the opposed edges, the second channel further comprising a plurality of openings therein, a first plurality of apertures aligned approximately parallel with and proximal to the first channel, and a second plurality of apertures aligned approximately parallel with and proximal to the second channel. The second clamping plate has a length and a pair of opposed edges corresponding to the length and comprises a first channel approximately parallel with the pair of opposed edges and corresponding to the first channel of the first clamping plate, and a first plurality of apertures aligned approximately parallel with and proximal to the first channel and corresponding to the first plurality of apertures of the first clamping plate. At least one securing structure, when engaging at least one pair of apertures of the first pluralities of apertures, secures the first clamping plate and second clamping plate around a tubular structure around which a sheet is wrapped.

In an embodiment, a temporary structure is provided. The temporary structure comprises at least one fabric sheet comprising a first end and a second end; at least three tubular components; and at least one clamp. The clamp comprises a first clamping plate and a second clamping plate. The first clamping plate has a length and a pair of opposed edges corresponding to the length, and further comprises a first channel approximately parallel with the pair of opposed edges and proximal to a first of the opposed edges, a second channel approximately parallel with the pair of opposed edges and proximal to a second of the opposed edges, the second channel further comprising a plurality of openings therein, a first plurality of apertures aligned approximately parallel with and proximal to the first channel, and a second plurality of apertures aligned approximately parallel with and proximal to the second channel. The second clamping plate has a length and a pair of opposed edges corresponding to the length, and further comprises a first channel approximately parallel with the pair of opposed edges and corresponding to the first channel of the first clamping plate, and a first plurality of apertures aligned approximately parallel with and proximal to the first channel and corresponding to the first plurality of apertures of the first clamping plate. The fabric sheet is wrapped around a first of the tubular components and secured between the first and second clamping plates at the first channels of the clamping plates. At least one of the first and second ends of the fabric sheet is secured to a second of the tubular components. A third of the tubular components is secured in the second channel of the first clamping plate.

In an embodiment, a method of forming a temporary structure is provided. The method comprises wrapping a sheet around a first tubular structure; providing a clamp structure comprising a first clamping plate having a length and a pair of opposed edges corresponding to the length, a first channel approximately parallel with the pair of opposed edges and proximal to a first of the opposed edges, and a second channel approximately parallel with the pair of opposed edges and proximal to a second of the opposed edges, the second channel further comprising a plurality of openings therein; and a second clamping plate having a length and a pair of opposed edges corresponding to the length, a first channel approximately parallel with the pair of opposed edges and corresponding to the first channel of the first clamping plate such that when the plates are positioned with respect to one another, the first channels form a tubular channel; aligning the tubular structure in between a first and second clamping plate in the tubular channel formed by the two first channels; securing the first and second clamping plates around the tubular structure; and securing a second tubular structure in the second channel, wherein the second tubular structure is at least a portion of a temporary structure.

BRIEF DESCRIPTION OF THE DRAWINGS

FIG. 1A is a front perspective view of an embodiment of a sheeting clamp for a temporary structure;

FIG. 1B is a rear perspective view of an embodiment of the sheeting clamp of FIG. 1A;

FIG. 2B is a rear view of the first clamping plate of FIG. 2A;

FIG. 3B is a rear view of the second clamping plate of FIG. 3A;

FIG. 4 shows the sheeting clamp of FIGS. 1A and 1B clamping a fabric panel;

FIG. 5A is a front perspective view of the sheeting clamp of FIGS. 1A and 1B clamping a fabric panel with a tensioning component secured in the clamp;

FIG. 6A is a front perspective view of a second embodiment of a sheeting clamp for a temporary structure which is clamping a fabric panel with a tensioning component secured in the clamp;

FIG. 7B is a rear view of the first and second clamping plate of FIG. 7A;

FIG. 8 shows the sheeting clamp of FIGS. 1A and 1B clamping a fabric panel and with tension-applying structures applying tension to the tensioning component;

FIG. 9 shows a temporary structure having a roof of fabric panels secured to the temporary structure using the sheeting clamp of FIGS. 1A and 1B;

FIG. 10 is a detailed view of the portion X from FIG. 9; and

DETAILED DESCRIPTION

Figure 2A:
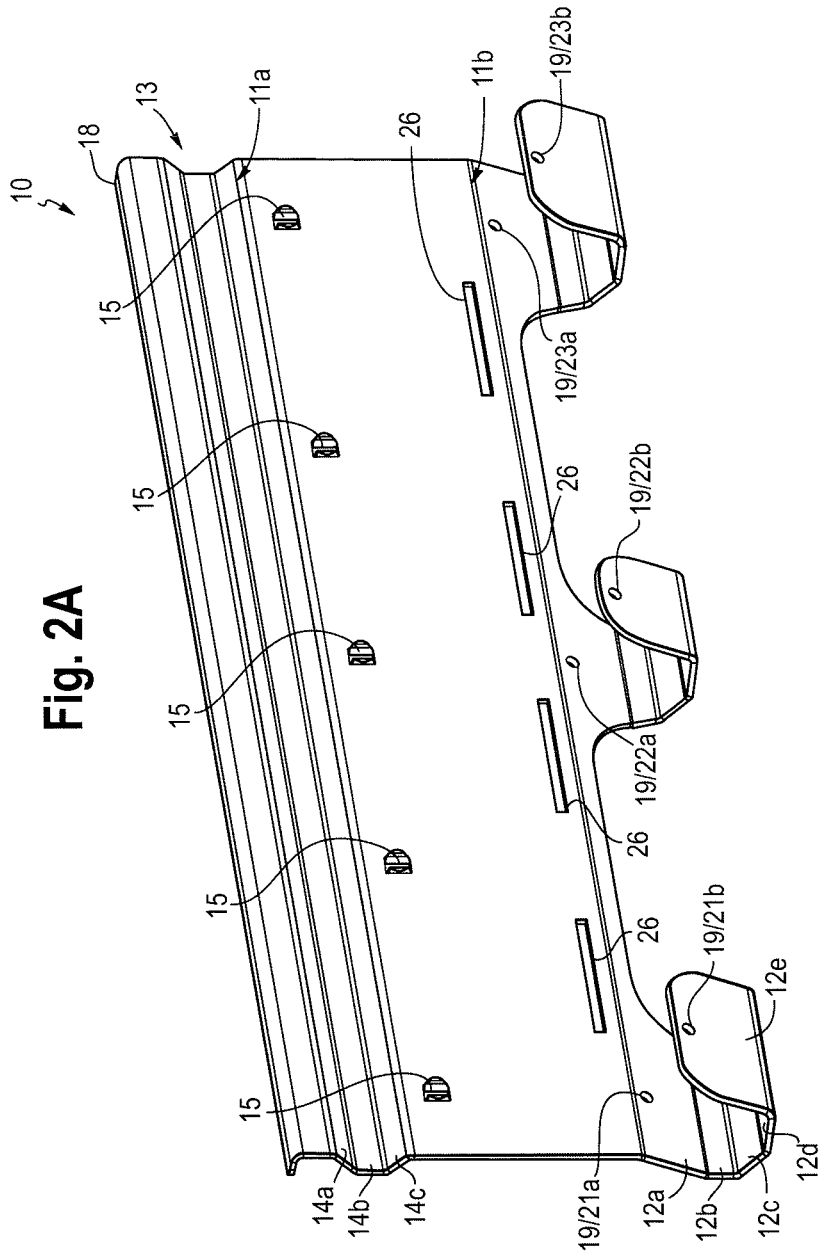
FIG. 2A is a front view of a first clamping plate of the sheeting clamp of FIGS. 1A and 1B.

In a first embodiment, such as shown in FIGS. 1A and 1B, a sheeting clamp for a temporary structure 100 includes a first clamping plate 10 (also referred to herein as the first plate 10) and a second clamping plate 30 (also referred to herein as the second plate 30). A plurality of securing structures 50 secures the first and second clamping plates 10, 30 together.

Figure 2C:
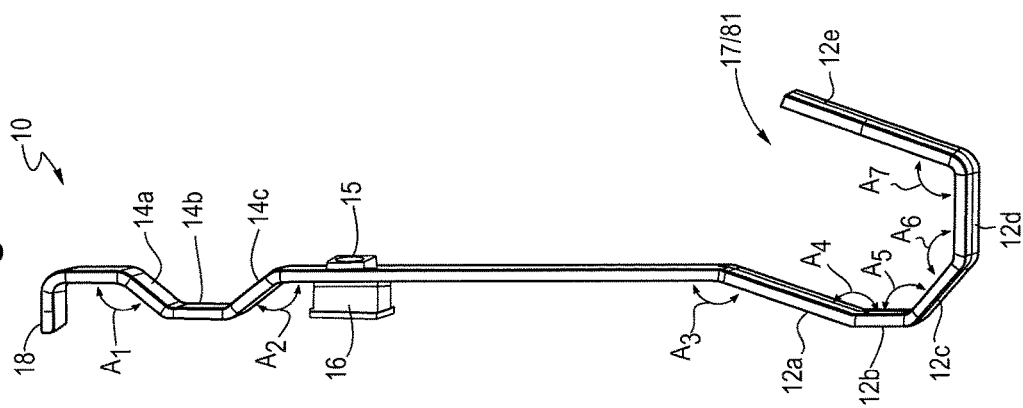
FIG. 2C is a side view of the clamping plate of FIG. 2A.

As better viewed in FIGS. 2A-2C, the first clamping plate 10 has a first channel 13 extending the length of the plate 10 approximately parallel with the opposed edges 11a/11b. A second channel 17 also extends the length of the plate 10 approximately parallel with the opposed edges 11a/11b but contains a plurality of openings 20 in the channel 17. In the embodiment shown, the second channel 17 includes two openings 20. However, in further embodiments, the second channel 17 on the first clamping plate 10 may have at least two, at least three, or at least four openings 20. In further embodiments, the second channel 17 may have two, or three, or four openings 20. In yet a further embodiment, the second channel 17 may contain more than two, or more than three, or more than four openings 20.

In an embodiment, the openings 20 are approximately from 2 inches to 15 inches wide, or from 2 inches to 14 inches wide, or from 3 inches to 13 inches wide, or from 4 inches to 12 inches. In the embodiment shown in FIGS. 2A-2B, the openings 20 are from 9 inches to 14 inches wide, or from 10 inches to 13 inches wide, or from 11 inches to 12 inches wide. In an embodiment, the openings 20 are 11.81 inches wide.

As illustrated in FIGS. 2A and 2B, in the embodiment shown, the first channel 13 of the first plate 10 is approximately semi-circular with the semi-circular shape formed by three surfaces 14a, 14b, 14c angled relative to one another. Surface 14a angles outward from the plane of the first plate 10 and, in the view shown, downward (e.g., in the direction of the second channel 17) to surface 14b. In an embodiment, the surface 14a projects away from the plane of the first plate 10 forming an angle $A_1$ of 130-150°, or 135-145°, or 140°. Surface 14b is approximately parallel with first plate 10. Surface 14c angles back towards the first plate 10 to complete the approximately semi-circular first channel 13 and meets back with the first plate 10 forming an angle $A_2$ of 130-150°, or 135-145°, or 140°. In further embodiments, the first channel 13 may be formed using any number of surfaces, including, for example, two surfaces forming a "V"-like shape, or be a continuous curve.

By forming the first channel 13 using at least two (e.g., two, three, four) angled surfaces (e.g., 14a, 14b, 14c as shown) or a single continuous curve, the first channel 13 has an approximate inner diameter of 1-5 inches, or 1-3.5 inches, or 1-2 inches. In an embodiment, the first channel 13 has an approximate inner diameter of 2 inches, or 1.9 inches, or 1.8 inches. In an embodiment, the first channel 13 preferably has an inner diameter of 1.9 inches. In an embodiment, the inner diameter of the first channel 13 corresponds to the outer diameter of an approximately tubular structure to which a fabric panel is secured. In a further embodiment, the inner diameter of the first channel 13 corresponds to the outer diameter of a scaffold tube.

As also illustrated in FIGS. 2A and 2B, in the embodiment shown, the second channel 17 of the first plate 10 is a hook-like shape formed by a plurality of surfaces 12a, 12b, 12c, 12d and 12e. Surface 12a angles outward from the plane of the first plate 10 in the same direction as surface 14a and, in the view shown, downward (e.g., away from the first channel 13) to surface 12b. In an embodiment, the surface 12a projects away from the plane of the first plate 10 forming an angle $A_3$ of 150-170°, or 155-165°, or 159-161°, or 160.7°. Surface 12b is approximately parallel with first plate 10 and forms an angle of $A_4$ of 150-170°, or 155-165°, or 159-161°, or 160.7° relative to surface 12a. Surface 12c angles back towards the first plate 10 forming an angle $A_5$ of 120-140°, or 125-135°, or 128-132°, or 130-131°, or 130.3° to connect with surface 12d which is approximately perpendicular to the plane of the first plate 10. The transition from surface 12c to 12d forms an angle $A_6$ of 120-150°, or 130-145°, or 135-140°, or 139.7°. Surface 12e projects away from surface 12d and, in the view shown, upward from surface 12d (e.g., towards the first channel 13) in order to complete the hook-like formation. In the embodiment, surface 12e projects from surface 12d at an angle $A_7$ of 100-115°, or 105-112°, or 108-110°, or 109.3°.

The hook-like shape is interrupted (twice in the embodiment shown) by openings 20. As will be shown with respect to FIG. 8, the openings 20 allow a tension-applying structure or device 76 to be connected to a tensioning component 70 which may be secured in the second channel 17. In the embodiment shown in FIG. 8, the tension-applying structure or device 76 is connected to both the tensioning component 70 and a member 78 of a temporary structure (not shown).

The first plate 10 also includes a first plurality of apertures 15 which is aligned approximately parallel with and proximal to the first channel 13. While in the embodiment shown, each aperture of the plurality of apertures 15 contains a cage nut 16, the apertures 15 do not require a cage nut or other hardware component or structure to be provided with the apertures 15. In the embodiment shown, the first plurality of apertures 15 is inward of the first channel 13 (e.g., below the first channel 13 in the orientation shown in FIGS. 2A and 2B), but still proximal to the first channel 13. If the first plurality of apertures 15 were positioned outward of the first channel 13, any securing structure engaging the plurality of apertures 15 would contact and potentially damage a fabric panel secured in the clamp 100, as illustrated more clearly with respect to FIG. 4.

In further embodiments, the first plurality of apertures 15 may be located further away from the first channel 13 in a direction towards the second channel 17. However, the further away from the first channel 13 the first plurality of apertures 15 is positioned, the less clamping pressure is provided to hold a fabric sheet for a temporary structure between the plates 10, 30. In a preferred embodiment, the first plurality of apertures 15 is within from 0.5 inches to 3 inches, or preferably from within 0.75 inches to 2 inches, or preferably from within 1 inch to 2 inches of the center of the first channel 13. In an embodiment, the first plurality of apertures 15 is approximately 1.75 inches of the center of the first channel 13.

A second plurality of apertures 19 is aligned approximately parallel with and proximal to the second channel 17. As illustrated in FIGS. 2A and 2B, in the embodiment show, the second plurality of apertures 19 comprises sets of apertures (21a/21b, 22a/22b, 23a/23b) with a first aperture in the sets (21a, 22a, 23a) positioned on surface 12a and a second aperture in the sets (21b, 22b, 23b) positioned on surface 12e.

Figure 3A:
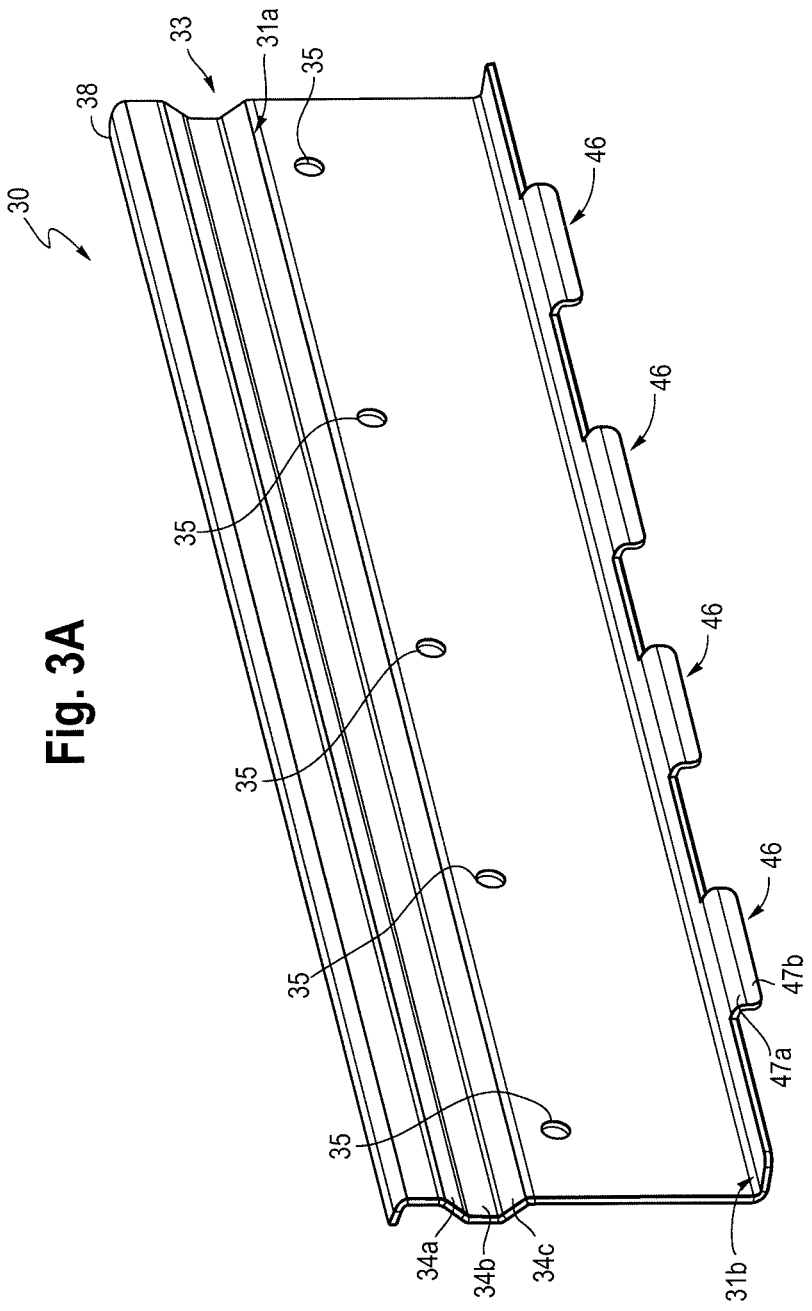
FIG. 3A is a front view of a second clamping plate of the sheeting clamp of FIGS. 1A and 1B.
Figure 3C:
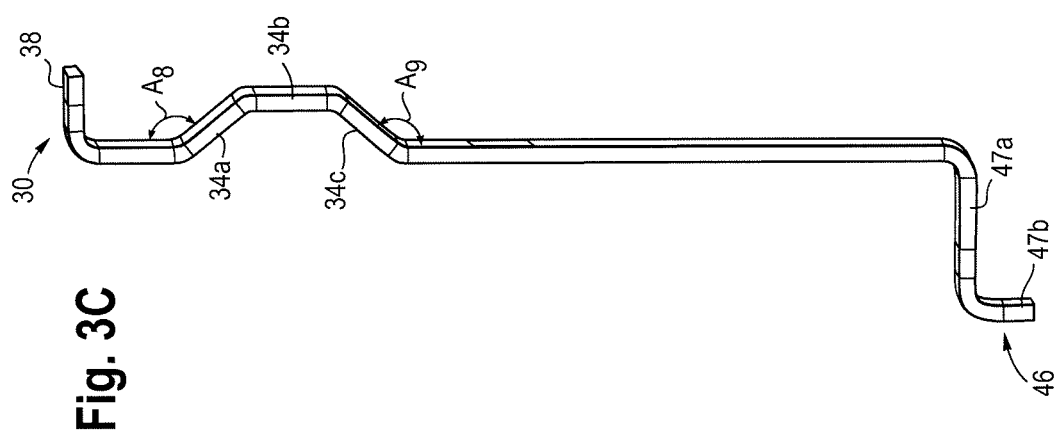
FIG. 3C is a side view of the clamping plate of FIG. 3A.

As shown in FIGS. 3A and 3B, the second clamping plate 30 has a first channel 33 extending the length of the plate 30 approximately parallel with the opposed edges 31a/31b. As illustrated in FIGS. 3A and 3B, in the embodiment shown, the first channel 33 of the second plate 30 is approximately semi-circular with the semi-circular shape formed by three surfaces 34a, 34b, 34c angled relative to one another. Surface 34a angles outward from the plane of the second plate 30 and, in the view shown, downward (e.g., away from the flared lip 38) to surface 34b. In an embodiment, the surface 34a projects away from the plane of the second plate 30 forming an angle $A_8$ of 130-150°, or 135-145°, or 140°. Surface 34b is approximately parallel with second plate 30. Surface 34c angles back towards the second plate 30 to complete the approximately semi-circular first channel 33 and meets back with the second plate 30 forming an angle $A_9$ of 130-150°, or 135-145°, or 140°. In further embodiments, the first channel 33 may be formed using any number of surfaces or be a continuous curve.

By forming the first channel 33 using surfaces (e.g., 34a, 34b, 34c as shown), the first channel 33 has an approximate inner diameter of 1-5 inches, or 1-3.5 inches, or 1-2 inches. In an embodiment, the first channel 33 has an approximate inner diameter of 2 inches, or 1.9 inches, or 1.8 inches. In an embodiment, the first channel 33 preferably has an inner diameter of 1.9 inches. In an embodiment, the inner diameter of the first channel 33 corresponds to the outer diameter of an approximately tubular structure to which a fabric panel is secured. In a further embodiment, the inner diameter of the first channel 33 corresponds to the outer diameter of a scaffold tube.

The second plate 30 also includes a first plurality of apertures 35 which is aligned approximately parallel with and proximal to the first channel 33. In the embodiment shown, the first plurality of apertures 35 is inward of the first channel 33 (e.g., below the first channel 33 in the orientation shown in FIGS. 3A and 3B), but still proximal to the first channel 33. If the first plurality of apertures 35 were positioned outward of the first channel 33, any securing structure engaging the plurality of apertures 35 would contact and potentially damage a fabric panel secured in the clamp 100, as illustrated more clearly with respect to FIG. 4.

In further embodiments, the first plurality of apertures 35 may be located further away from the first channel 33 in a direction away from the flared lip 38. However, the further away from the first channel 33 the first plurality of apertures 35 is positioned, the less clamping pressure is provided to hold a fabric sheet for a temporary structure between the plates 10, 30. In a preferred embodiment, the first plurality of apertures 35 is within from 0.5 inches to 3 inches, or preferably from within 0.75 inches to 2 inches, or preferably from within 1 inch to 2 inches of the center of the first channel 13. In an embodiment, the first plurality of apertures is approximately 1.75 inches of the center of the first channel 13.

As illustrated in FIGS. 1A and 1B, the first pluralities of apertures 15, 35 of the first and second clamping plates 10, 30, respectively are aligned with one another so as to form a plurality of holes through the first and second clamping plates 10, 30 when the plates 10, 30 are positioned with respect to one another to clamp a fabric sheet, such as in FIG. 4.

The first pluralities of apertures 15, 35 are configured to receive a securing structure 50, such as, for example, a bolt, screw, nail, rod, clip, clasp or other structure or device. In the embodiment shown, each aperture of the first pluralities of apertures 15, 35 are configured to receive a securing structure 50 which is a bolt that further engages the cage nuts 16 of the first plurality of apertures 15 of the first clamping plate 10. In an embodiment, as shown in FIG. 1A, the securing structures 50 further include a graspable end 51 for manual manipulation (e.g., tightening and/or loosening by turning) or manipulation by a manual or powered tool.

Similarly, the each second plurality of apertures 19 of the first plate 10 may be configured to receive a securing structure, such as, for example, a bolt, screw, nail, rod, clip, clasp or other structure or device. However, in the embodiment shown in FIGS. 5A-5C, such securing structure are unnecessary because the tension applied by a tension-applying structure or device is sufficient to ensure a tensioning component 70 in the second channel 17, as in the embodiment shown in FIG. 8.

In an embodiment, the first and second plates 10, 30 further include a flared lip 18, 38. The flared lip 18, 38 causes the edge of the first and second clamping plates 10, 30 to be turned outward away from the first channels 13, 33. As will be shown with respect to FIGS. 4-5C, when a fabric panel is slid into the channel formed by the first channels 13, 33, the fabric panel is not in contact with an edge of the first and second plates 10, 30 and potential damage (e.g., tears, rips, punctures) from contact with an edge is avoided.

In some embodiments, such as shown in FIGS. 1A-3B, the first clamping plate 10 may further include at least one aligning aperture 26 configured to engage an at least one aligning protuberance 46 of the second clamping plate 30. In the embodiment shown, the first plate 10 includes a plurality of aligning apertures 26 and the second plate 30 includes a plurality of aligning protuberances 46, each of which corresponds to a respective one of the plurality of aligning apertures 26.

In the embodiment shown, the aligning apertures 26 are rectangular slots located parallel to and proximal with the second channel 17. Specifically, in the embodiment, shown, the aligning apertures 26 are inward from (e.g., above, in the view shown in FIGS. 2A and 2B) the second channel 17. As further shown in the embodiment depicted in FIGS. 1A-3B, the aligning protuberances 46 are rectangular bends projecting away from (e.g., downward from, in the view shown) opposed edge 31b. Specifically, as shown in FIGS. 3A and 3B, the opposed edge 31b projects approximately perpendicularly, or preferably perpendicularly, from the plane of the second plate 30 in a direction opposite that of the first channel 33. The aligning protuberances 46 comprise a first portion 47a which projects further outward from and parallel with the opposed edge 31b and a second portion 47b which turns approximately perpendicular to, or perpendicular to, the first portion 47a in a direction that further from (e.g., downward from, in the view shown) the second clamp plate 30 so as to be parallel with the first plate 30.

When assembling the clamp 100, the second plate 30 is tipped approximately perpendicular relative to the first plate 10 such that the second portions 47b of the aligning protuberances 46 engage the aligning apertures 26 of the first plate 10. As the aligning protuberances 46 further engage the aligning apertures 26, the second plate 30 is rotated to become approximately parallel with the first plate 10 such that the first portions 47a of the aligning protuberances 46 engage the aligning apertures 26 and the first channels 13, 33 of the first and second plates 10, 30, respectively align to form a single first tubular channel 80, as shown in FIGS. 1A and 1B.

Once the first and second plates 10, 30 are by the aligning apertures and protuberances 26/46, the securing structures 50 are used to at least partially engage the first pluralities of apertures 15, 35. For example, in the exemplary embodiment shown, the securing structures 50 are loosely engaged in the first pluralities of apertures 15, 35. This partial engagement allows a fabric panel (or at least a portion thereof) to slidingly engage the first tubular channel 80.

In the embodiment shown, the fabric panel 60 (or portion thereof) is secured around a cylindrical structure 65, such as a scaffold tube, rope or other tubular component. The clamp 100 can slide over cylindrical structure 65 so that the cylindrical structure 65 is positioned in the first tubular channel 80 with the fabric panel 60 projecting out of the clamp 100 at the flared lips 18, 38.

Once the fabric panel 60 is in position, the securing structures 50 are tightened to compress the first and second plates 10, 30 and secure the cylindrical structure 65 in the first tubular channel 80.

Figure 5B:
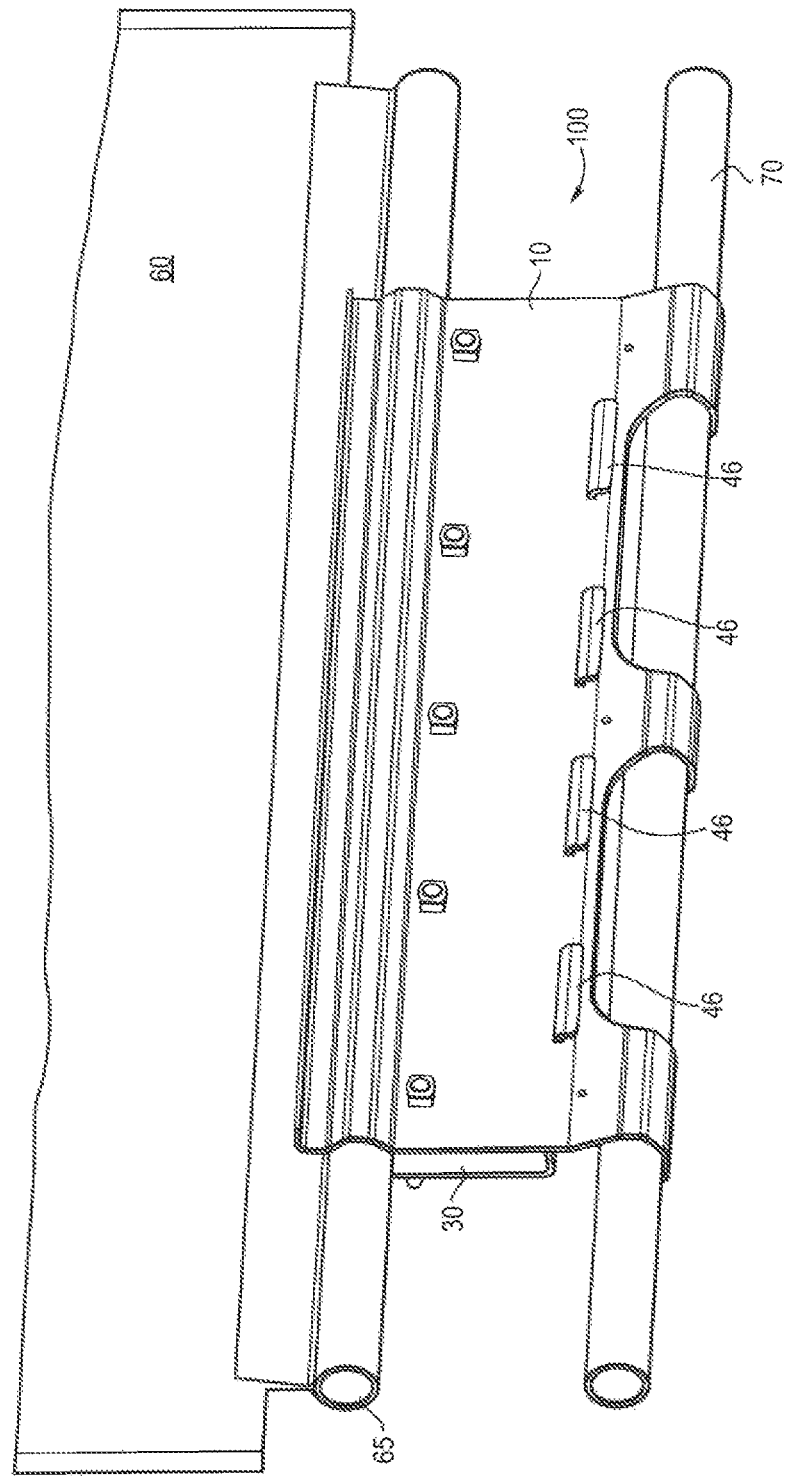
FIG. 5B is a rear perspective view of the embodiment shown in FIG. 4A.
Figure 5C:
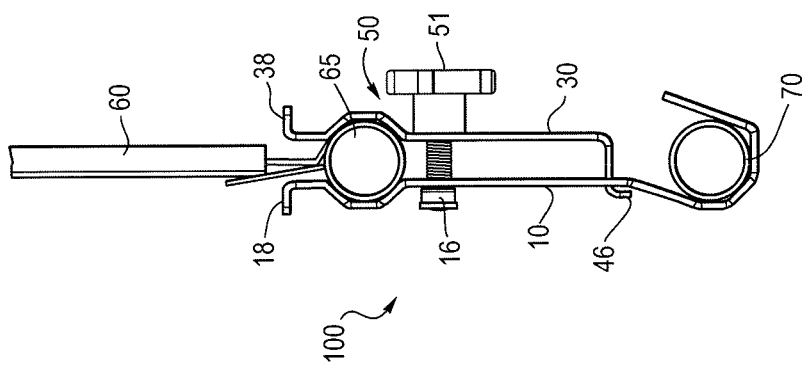
FIG. 5C is a side view of the embodiment shown in FIG. 4A.

As illustrated in FIGS. 5A-5C, the second channel 17 secures a tensioning component 70. In the embodiment shown, the tensioning component 70 is another cylindrical structure, such as a scaffold tube, rope or other tubular structure which can be used to support tension to pull the fabric sheet 60 taut when the loose end (not shown) of the fabric panel 60 is secured to at least a portion of a temporary structure. In other words, the tensioning component 70 serves as a brace to which a tension-applying structure or tensioning device 76 (not shown) is secured to provide a force capable of pulling on the clamp 100 and making the fabric sheet 60 taut. In the embodiment illustrated in FIG. 8, the tension-applying structure or device 76 is a tensioning strap. In other embodiments, the tension-applying structure or device 76 may be a rope, clamp, clip, pulley system or other structure or device capable of applying tension by connection to the tensioning component 70.

In view of the above, it is desirable that channels 13 and 33 have the same inner diameter. As will be appreciated, and as depicted in FIGS. 5A-5C, when plates 10 and 30 are aligned with respect to one another, the respective first channels 13, 33 align to form an approximately tubular channels 80 into which tube 65 is positioned. In an embodiment, the inner diameter of tubular channel 80 is approximately 1-5 inches, or 1-3.5 inches, or 1-2 inches. In an embodiment, the inner diameter of tubular channel 80 is approximately 2 inches, or 1.9 inches, or 1.8 inches. In an embodiment, channel 80 has an inner diameter of 1.9 inches.

Similarly, the second channel 17 of the first plate 10 in essence forms a second tubular channel 81 into which the tensioning component 70 is positioned. In an embodiment, the inner diameter of tubular channel 81 is approximately 1-5 inches, or 1-3.5 inches, or 1-2 inches. In an embodiment, the inner diameter of tubular channel 81 is approximately 2 inches, or 1.9 inches, or 1.8 inches. In an embodiment, the tubular channel 81 has an inner diameter of 1.9 inches.

In an embodiment, it is desirable that the inner diameter of tubular channel 80 is the same as the inner diameter of tubular channel 81.

Figure 6B:
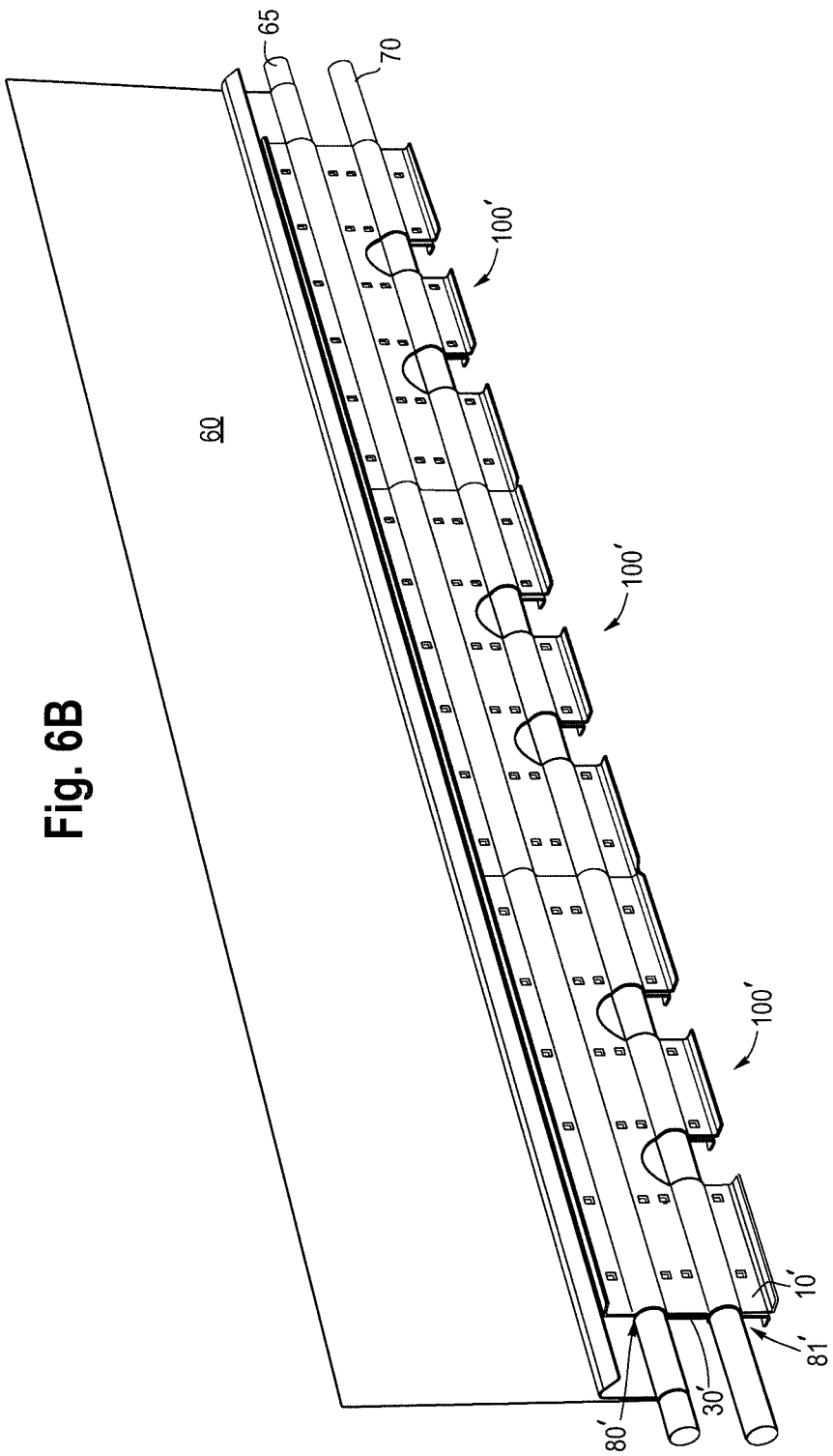
FIG. 6B is a rear perspective view of a the sheeting clamp of FIG. 6A.

FIGS. 6A-6B show a second embodiment of a sheeting clamp for a temporary structure 100' in which both the first and second clamp plates 10', 30' are identical. Like clamp 100, the first and second plates 10', 30' of the clamp 100' contain a first channel 13', 33' which extends the length of the plates 10', 30' and is approximately parallel with the opposed edges 11a'/11b', 31a'/31b'. However, instead of a second tubular channel 80 formed entirely by the second channel 17 of the first panel 10, as in with respect to clamp 100, in the embodiment shown in FIGS. 6A-7B, both the first and second plates 10', 30' contain a second channel 17', 37' also extending the length of the plates 10', 30' approximately parallel with the opposed edges 11', 31' to form a second tubular channel 81', as discussed in further detail below.

As shown, the second channels 17', 37' include a plurality openings 20', 40'. In the embodiment shown, the second channels 17', 37' include two openings 20', 40'. However, in further embodiments, the second channels 17', 37' may have at least two, at least three, or at least four openings 20'. In further embodiments, the second channels 17'/37' may have two, or three, or four openings 20'. In yet a further embodiment, the second channels 17'/37' may contain more than two, or more than three, or more than four openings 20'.

In an embodiment, the openings 20' are approximately from 2 inches to 15 inches wide, or from 2 inches to 14 inches wide, or from 3 inches to 13 inches wide, or from 4 inches to 12 inches. In the embodiment shown in FIGS. 7A-2B7, the openings 20' are from 2 inches to 7 inches wide, or from 3 inches to 6 inches wide, or from 3.5 inches to 5 inches wide. In an embodiment, the openings 20' are 4 inches wide.

As shown and described with respect to FIG. 8, the openings 20' allow a tension-applying structure or device 76 to be connected to a tensioning component 70 which may be secured in the second channel 17'.

Figure 7A:
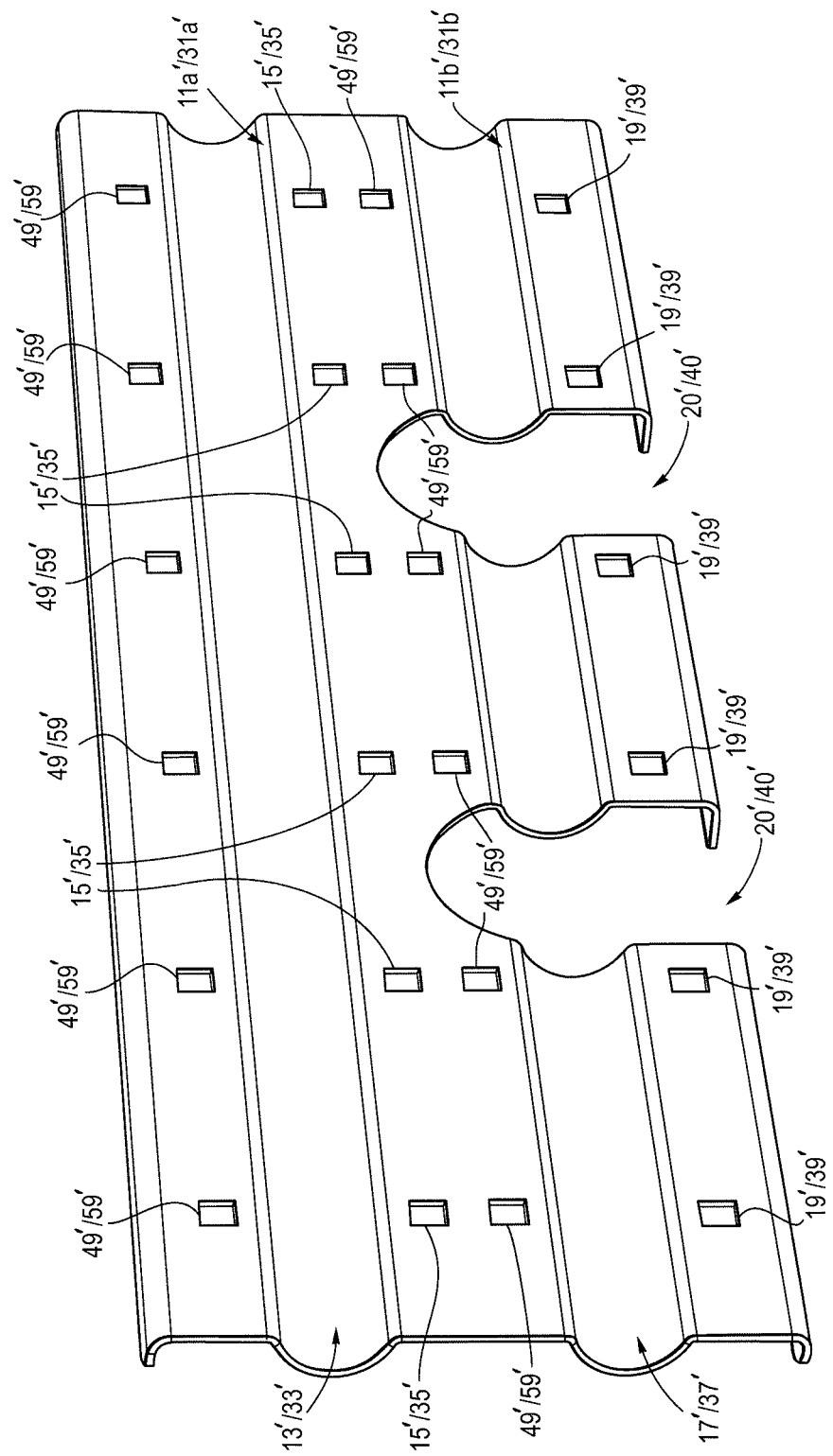
FIG. 7A is a front view of a first and second clamping plate of the sheeting clamp of FIGS. 6A and 6B.
Figure 7C:
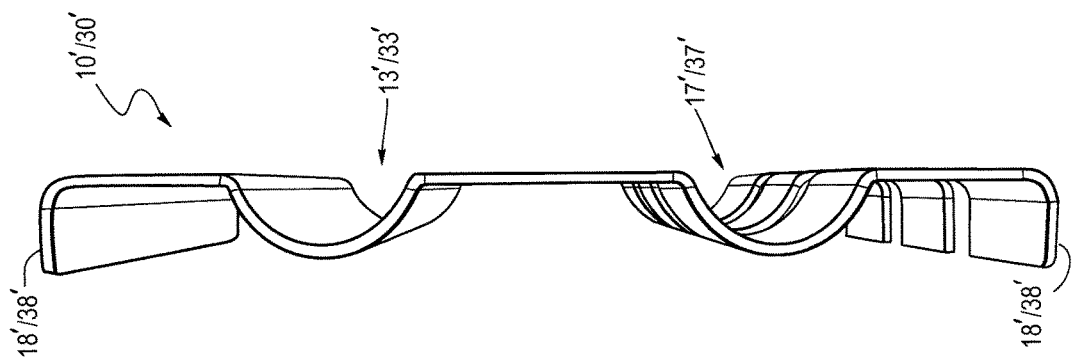
FIG. 7C is a side view of the clamping plate of FIG. 7A.

As illustrated in FIGS. 7A-7B, in the embodiment shown, the first and second channels 13', 33', 17', 37' are approximately semi-circular with the semi-circular shape formed from a continuous curve instead of multiple angled surfaces as in clamp 100. However, in an alternative embodiment, any of channels 13', 33', 17', 37' may be formed using a plurality of angles surfaces, as described with respect to channels 13 and 33.

Like clamp 100, semi-circular channels 13', 33', 17', 37' have an approximate inner diameter of 1-5 inches, or 1-3.5 inches, or 1-2 inches. In an embodiment, the channels 13', 33', 17', 37' each have an inner diameter of approximately 2 inches, or 1.9 inches, or 1.8 inches. In an embodiment, each of the channels 13', 33', 17', 37' has an inner diameter of 1.9 inches. In an embodiment, the inner diameter of the channels 13', 33', 17', 37' corresponds to the outer diameter of an approximately tubular structure to which a fabric panel is secured. In a further embodiment, the inner diameter of the channels 13', 33', 17', 37' corresponds to the outer diameter of a scaffold tube.

In an embodiment, it is desirable that channels 13' and 33' have the same inner diameter and channels 17' and 37' have the same inner diameter. Still preferably, it is desirable that each of channels 13', 33', 17' and 37' have the same inner diameter.

As will be appreciated, and as depicted in FIGS. 6A-6B, when plates 10' and 30' are aligned with respect to one another, the respective first channels 13', 33' and respective second channels 17', 37' align to form two approximately tubular channels 80', 81' (not shown) into which tubes 65, 70 are positioned. In an embodiment, the inner diameter of tubular channels 80', 81' is approximately 1-5 inches, or 1-3.5 inches, or 1-2 inches. In an embodiment, the inner diameter of tubular channels 80', 81' is approximately 2 inches, or 1.9 inches, or 1.8 inches. In an embodiment, each of channels 80', 81' has an inner diameter of 1.9 inches.

In an embodiment, it is desirable that tubular channels 80', 81' have the same inner diameter.

The first and second plates 10', 30' also include at least first pluralities of apertures 15', 35' and second pluralities of apertures 19', 39'. In the embodiment shown, the first pluralities of apertures 15', 35' is inward of the first channels 13', 33' (e.g., below the first channels 13', 33' in the orientation shown in FIGS. 7A and 7B), but still proximal to the first channels 13', 33'.

In further embodiments, the first pluralities of apertures 15', 35' may be located further away from the first channels 13', 33' in a direction towards the second channels 17', 37' (e.g., above the first channels 13', 33' in the orientation shown in FIGS. 7A and 7B). If the first pluralities of apertures 15', 35' were positioned outward of the first channels 13', 33', any securing structure engaging the apertures would contact and potentially damage a fabric panel secured in the clamp 100', as described more fully above with respect to FIGS. 1A-3B. In further embodiments, the first pluralities of apertures 15', 35' may be located further away from the first channels 13', 33' in the direction of the second channels 17', 37'. However, the further away from the first channels 13', 33' the first pluralities of apertures are, the less clamping pressure is provided to hold a fabric sheet for a temporary structure between plates 10', 30'. In a preferred embodiment, the first pluralities of apertures 15', 25' are within 0.5 inches to 3 inches, or preferably from within 0.75 inches to 2 inches, or preferably from within 1 inch to 2 inches of the center of the first channels 13', 33'. In an embodiment, the first pluralities of apertures 15', 35' are within approximately 1.80 inches of the center of the first channels 13', 33.

Second pluralities of apertures 19', 39' are aligned approximately parallel with and proximal to the second channels 17', 37'. In contrast to the sets of apertures which made the second plurality of apertures 19 described with reference to FIGS. 2A and 2B, above, the apertures of both second pluralities of apertures 19', 39' are single apertures.

Like described with reference to the first pluralities of apertures 15', 35', the second pluralities of apertures 19', 39' need to be close enough to the second channels 17', 37' such that the clamping pressure provided by securing structures 50' (not shown) engaging the pluralities of apertures 19', 39' is sufficient to hold a tensioning component 70 in the second tubular channel 81' formed by the second channels 17', 37' of the first and second plates 10', 30'. The further away from the second channels 17', 37' the second pluralities of apertures 19', 39' are, the less clamping pressure created. In a preferred embodiment, the second pluralities of apertures 19', 39' are within 0.5 inches to 3 inches, or preferably from within 0.75 inches to 2 inches, or preferably from within 1 inch to 2 inches of the center of the first channels 19', 39'. In an embodiment, the first pluralities of apertures 19', 39' are within approximately 1.80 inches of the center of the first channels 19', 39'.

As illustrated in FIGS. 6A and 6B, each aperture in the first plurality of apertures 15' of the first plate 10' corresponds to a respective aperture of the first plurality of apertures 35' of the second plate 30'. Similarly, each aperture of the second plurality of apertures 19' of the first plate 10' corresponds to a respective aperture of the second plurality of apertures 39' of the second plate 30'. In other words, the first pluralities of apertures 15', 35' are aligned with one another so as to form a plurality of holes through the first and second clamping plates 10', 30' and the second pluralities of apertures 19', 39' are aligned with one another so as to form a plurality of holes through the first and second clamping plates 10', 30' when the plates 10', 30' are positioned with respect to one another to clamp a fabric sheet, such as in FIGS. 6A and 6B.

The pluralities of apertures 15', 35' and 19', 39' are configured to receive a securing structure 50' (not shown), such as, for example, a bolt, screw, nail, rod, clip, clasp or other structure or device, and as further described in detail with respect to FIGS. 1A-5C.

In the embodiments shown in FIGS. 6A-7B, the plates 10', 30' include additional pluralities of apertures 49', 59', respectively, each also configured to receive a securing structure 50'. The additional pluralities of apertures 49', 59' provide further flexibility when securing a fabric sheet 60 (not shown) and/or tensioning component 70 (not shown) to the clamp 100'.

In an embodiment, the first and second plates 10', 30' further include flared lips 18', 38'. As described above, the flared lips 18', 38' help prevent potential damage (e.g., tears, rips, punctures) to a fabric panel 60 from contact with an edge.

When assembling the clamp 100', first and second plates 10', 30' are aligned with one another such that the first channels 13', 33' and second channels 17', 37' align to form first and second tubular channels 80', 81', respectively (see FIGS. 6A and 6B).

Once the first and second plates 10', 30' are aligned, securing structures 50' (not shown) are used to at least partially engage one of the pluralities of apertures 15' and 35', 19' and 39', 49' or 59' to allow a fabric panel 60 (or at least a portion thereof) and/or a tensioning component 70 (or at least a portion thereof) to slidingly engage the first and/or second tubular channels 80', 81', respectively.

In the embodiment shown, the fabric panel 60, tensioning components 70 and tension-applying structure of device 76 are as described with respect to FIGS. 4-5C.

In embodiments, clamps 100, 100' may be any length suitable to secure and tension a fabric panel 60. In a preferred embodiment, clamps 100, 100' have a length of 0.5-20 feet, or 1-15 feet, or 1-10 feet, or 2-10 feet. In an embodiment, the clamps 100, 100' are available in different lengths to accommodate particular uses, temporary structures and/or construction limitations/parameters. In an embodiment, clamps 100, 100' have a length of approximately 2-5 feet, for preferably from 2-4 feet, or preferably 3 feet. In an embodiment, clamps 100, 100' have a length selected from the group consisting of approximately 1 foot, 3 feet, 5 feet, 7 feet, and 10 feet.

In an embodiment, clamps 100, 100' have a height of approximately 8-16 inches, or preferably 9-15 inches, or preferably 10-14 inches, or preferably 11-13 inches, or preferably 12 inches.

In an embodiment, clamps 100, 100' have a thickness of approximately 1-5 inches, or 2-4 inches, or 2-3 inches, or 2.5 inches.

The dimensions of clamps 100, 100' may vary depending on the specific application, project and temporary structure being assembled.

Because temporary structures are built in varying sizes, providing clamps 100, 100' capable of using standard cylindrical structures 65, such as, for example, scaffold tubes, to secure and tension fabric panels 60, it is no longer necessary to specifically manufacture panels for specific jobs. A bulk roll of fabric may be used, cut to width and simply wrapped around a cylindrical structure 65.

Furthermore, providing clamps 100, 100' in standard lengths, such as, for example, lengths corresponding to standard scaffold tube length, specialized clamping equipment becomes unnecessary. For example, standard scaffold tubes come in various lengths, including (by imperial measurement), 1 foot, 3 feet, 5 feet, 7 feet, 8 feet and 10 feet lengths. By providing clamps 100, 100' having lengths corresponding to the shortest scaffold tubes (e.g., 1 foot, 3 foot and/or 5 foot length), a single clamp length (or combination of clamp lengths) can be used for all jobs. As illustrated in FIGS. 6A and 6B, the cylindrical structure 65 around which the fabric panel 60 is wrapped is a 10 foot length scaffold tube. Each clamp 100' is 3 feet in length. To secure and tension the fabric panel 60, three clamps 100' are used. Remaining room on the ends of the cylindrical structure 65 and tensioning component 70 allow the cylindrical structure 65 and tensioning component 70 to be secured to a temporary structure as needed.

FIG. 8 shows the clamp 100 securing a fabric panel 60 with tension-applying structures or devices 76 applying tension to the tensioning component 70 to pull the fabric panel 60 taut, or at least tight enough to provide a barrier for a temporary structure (not shown). In the embodiment illustrated, fabric panel 60 is secured around cylindrical structure 65 and further secured between two rail members 79 of a temporary structure (not shown). The tension-applying structures or devices 76 are secured to and/or around a further member 78 of the temporary structure (not shown) and the tensioning component 70. Tightening the tension-applying structures 76 results in the fabric panel 60 being stretch and pulled tighter on the temporary structure (not shown).

FIG. 9 shows a temporary structure 150 using fabric sheets 60 (not labeled) as a roof 152 for the temporary structure 150. Portion X is shown in further detail in FIG. 10.

As shown in FIGS. 9 and 10, the fabric sheets 60 are secured between rail members 79 of the temporary structure 150. At one end (e.g., the bottom end as shown in the exemplary embodiments of FIGS. 9 and 10), the fabric sheets 60 are secured to the temporary structure 150 using clamps 100. The other end (e.g., the upper end as shown in the exemplary embodiments of FIGS. 9 and 10), the fabric sheets are connected to the temporary structure 150 using, for example, either a further clamp 100, a further rail member 79, a pocket connect as known and currently used in the art, or other structure or device useful in securing the panel 60 to the temporary structure 150.

In the embodiment shown in FIGS. 9 and 10, the members 78 are tension bars which are also secured between rail members 79.

As the tension-applying structures or devices 76 tighten, tension components 70 are pulled closer to members 78, causing the clamps 100 to move towards members 78 (e.g., in the view shown, downward). As the clamps 100 are pulled towards members 78, the fabric sheets 60 are pulled and stretched. Tension-applying structures or device 76 can continue to tighten until a desired tension on the fabric sheets 60 is reached (e.g., a tension desired for a specific temporary structure application or the maximum tension the fabric sheets can withstand).

Figure 11:
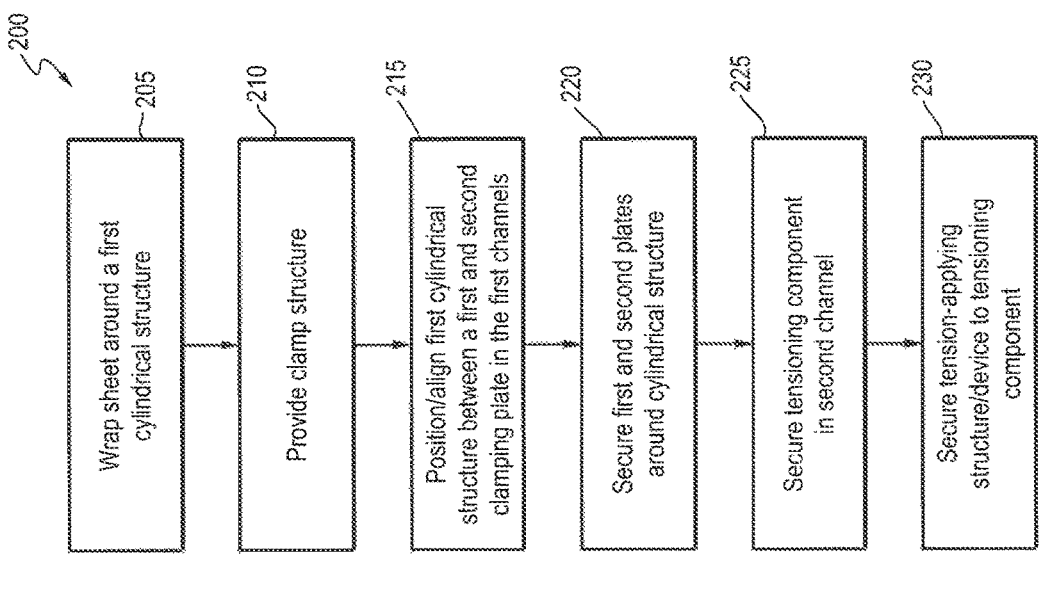
FIG. 11 is a flowchart of an exemplary method of forming a temporary structure.

In an embodiment, a method of forming a temporary structure 200 is provided, as shown in FIG. 11.

A first step 205 comprises wrapping a sheet around a first cylindrical structure. In an embodiment, the cylindrical structure is a tubular structure. In a further embodiment, the tubular structure is a scaffold tube.

Step 210 comprises providing a clamp structure, such as described with reference to one or more of FIGS. 1A-7B, above.

Step 215 comprises positioning/aligning the first cylindrical structure in between a first and second clamping plate of the clamp structure such that the cylindrical structure is positioned in a tubular channel formed by the first and second clamping plates.

Step 220 comprises at least partially securing the first and second plates around the cylindrical structure.

Step 225 comprises securing a tensioning component in a second channel of the clamp. In an embodiment, the tensioning component is a second cylindrical structure is a tubular structure, further a scaffold tube. In an embodiment, the tensioning component is a second cylindrical structure which is at least a portion of the temporary structure, further a scaffold tube which is at least a portion of the temporary structure.

In an embodiment, step 215 comprises positioning the first and second clamping plates relative to one another such that a first channel in the first plate and a first channel in the second plate form a first tubular channel and sliding the first cylindrical structure into the first tubular channel.

In an embodiment, the first and second clamping plates are at least partially secured to one another using one or more securing structures before the first cylindrical structure is aligned in between the clamp plates. The first and second plates may then be further secured in step 220.

In an embodiment, the step 215 comprises positioning a first plate with respect to the first cylindrical structure such that the first cylindrical structure engages a first channel of the first plate and positioning a second plate with respect to the first cylindrical structure such that the first cylindrical structure also engages a first channel of the second plate in order to sandwich the first cylindrical structure between the first and second plates.

In an embodiment, the step 220 of at least partially securing the first and second clamping plates together around the cylindrical structure comprises securing the plates together using at least one securing structure, as described above. However, in further embodiments, and particularly if a tensioning component is also to be secured between the plates, the step 220 of at least partially securing the first and second clamping plates together may include temporarily securing the plates together, such as holding them in position by hand or using a securing structure as described herein.

In an embodiment, the step 225 of securing a tensioning component in a second channel of the clamp comprising sliding the tensioning component into a second channel of the first clamp plate and securing the tensioning component in the channel. In a further embodiment, the step 225 comprises sliding the tensioning component into a second tubular channel formed by the first and second clamp plates and further securing the plates together such that both the first cylindrical structure and tensioning component are sandwiched between the plates.

In a further embodiment, the step 225 of securing the tensioning component comprises positioning the first plate with respect to the tensioning component and first cylindrical structure such that the first cylindrical structure engages the first channel of the first plate and the tensioning component engages a second channel of the first plate and positioning a second plate with respect to the first cylindrical structure and tensioning component such that the first cylindrical structure also engages the first channel of the second plate and the tensioning components also engages a second channel of the second plate such that both the first cylindrical structure and tensioning component are sandwiched between the plates.

In an embodiment, the method further includes the steps of 230 securing a tension-applying structure or device to the tensioning component and applying tension to pull the sheet taut. In an embodiment, the taut sheet forms a surface of a temporary structure, such as, for example, a wall or roofing panel.

Among other things, it should be appreciated that the scope of the present disclosure is not limited to the number of constituting components, the materials thereof, the shapes thereof, the relative arrangement thereof, etc., as described above, but rather the above disclosures are simply provided as example embodiments.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A temporary structure sheet clamp comprising:
   a first clamping plate having a first length and a first pair of opposed edges, wherein the first clamping plate further comprises
      a first channel approximately parallel with the pair of opposed edges and proximal to a first of the opposed edges,
      a second channel approximately parallel with the first pair of opposed edges and proximal to a second of the first pair of opposed edges, wherein the second channel is generally U-shaped, has a length, and is formed from a plurality of hook-shaped structures and a plurality of openings, wherein each of the plurality of hook-shaped structures is spaced apart from an adjacent one of the hook-shaped structures by one of the plurality of openings,
      a first plurality of apertures aligned approximately parallel with and proximal to the first channel, and
      a second plurality of apertures aligned approximately parallel with and distal from the first channel;
   a second clamping plate having a second length and a second pair of opposed edges, wherein the second clamping plate further comprises
      a first channel approximately parallel with the second pair of opposed edges and corresponding to the first channel of the first clamping plate, and
      a first plurality of apertures aligned approximately parallel with and proximal to the first channel of the second clamping plate and corresponding to the first plurality of apertures of the first clamping plate; and
   at least one securing structure which engages at least one pair of apertures of the first plurality of apertures of the first clamping plate and the first plurality of apertures of the second clamping plate,
   wherein, when the first and second clamping plates are positioned with respect to one another, the first channels of the first and second clamping plates together form a first tubular channel and the second channel of the first clamping plate is open at an upper end of the second channel along the length of the second channel, wherein the second channel is configured to support a tubular component via the hook-shaped structures and receive a tension-applying structure within one of the plurality of openings.

2. The clamp of claim 1, wherein the first and second clamping plates further include flared edges.

3. The clamp of claim 1, wherein the first clamping plate further comprises at least one aligning aperture and the second clamping plate further comprises at least one aligning protuberance.

4. The clamp of claim 1, wherein the first channels of the first and second clamping plates have inner diameters of from 1 inch to 5 inches.

5. The clamp of claim 1, wherein the second channel has an inner diameter of from 1 inch to 5 inches.

6. The clamp of claim 1, wherein the length of the first and second clamping plates is selected from the group consisting of 1 foot, 3 feet, 5 feet, 7 feet, and 10 feet, wherein the length of the first and second clamping plates is the same.

7. The clamp of claim 1, wherein each of the plurality of hook-shaped structures includes a first hook end which is a free end and a second hook end secured with the first clamp plate.

8. The clamp of claim 7, wherein each of the apertures of the second plurality of apertures of the first clamping plate has a corresponding opening in one of the plurality of hooked-shaped structures.

9. The clamp of claim 8, wherein the apertures of the second plurality of apertures are in the second hook ends of the plurality of hook-shaped structures and the corresponding openings are in the first hook ends of the respective ones of the plurality of hook-shaped structures.

10. The clamp of claim 1, wherein the first channel of the second clamping plate is proximal to a first of the second pair of opposed edges.

11. The clamp of claim 10, wherein the first clamping plate further includes at least one aligning aperture and the second clamping plate further includes at least one aligning protuberance.

12. The clamp of claim 11, wherein the at least one aligning aperture is positioned on the first clamping plate inward of the second channel.

13. The clamp of claim 12, wherein the at least one aligning aperture is a rectangular slot.

14. The clamp of claim 13, wherein the at least one aligning protuberance is a rectangular bend projecting away from a second of the second pair of opposed edges of the second clamping plate.

15. The clamp of claim 1, wherein each of the plurality of openings of the second channel have a width from 2 inches to 15 inches as measured along the length of the second channel.

16. A method of forming a temporary structure, the method comprising:
wrapping a sheet around a first tubular structure;
providing a clamp structure comprising a first clamping plate having a first length and a first pair of opposed edges, a first channel approximately parallel with the first pair of opposed edges and proximal to a first of the first pair of opposed edges, and a second channel approximately parallel with the first pair of opposed edges and proximal to a second of the first pair of opposed edges, wherein the second channel is approximately U-shaped, has a length and is formed from a plurality of hook-shaped structures and a plurality of openings, wherein each of the plurality of hook-shaped structures is spaced apart from an adjacent one of the hook-shaped structures by one of the plurality of openings; and a second clamping plate having a second length and a second pair of opposed edges, a first channel approximately parallel with the second pair of opposed edges and corresponding to the first channel of the first clamping plate such that when the plates are positioned with respect to one another, the first channels form a tubular first channel and the second channel of the first clamping plate is open at an upper end of the second channel along the length of the second channel;
aligning the first tubular structure in between the first and second clamping plates in the tubular channel,
securing the first and second clamping plates around the first tubular structure, and
securing a second tubular structure in the second channel, wherein the second tubular structure is at least a portion of a temporary structure.

17. The method of claim 16 further comprising attaching at least one tension-applying structure or device to the second tubular structure and applying tension to the second tubular structure.

18. A temporary structure comprising:
at least one fabric sheet secured to a first tubular component;
a second tubular component;
at least one clamp comprising
a first clamping plate having a first length and a first pair of opposed edges, wherein the first clamping plate further comprises
a first channel approximately parallel with the pair of opposed edges and proximal to a first of the opposed edges,
a second channel approximately parallel with the first pair of opposed edges and proximal to a second of the first pair of opposed edges, wherein the second channel has a length and is formed from a plurality of hook-shaped structures and a plurality of openings, wherein each of the plurality of hook-shaped structures is separated from an adjacent one of the hook-shaped structures by one of the plurality of openings,
a first plurality of apertures aligned approximately parallel with and proximal to the first channel, and
a second plurality of apertures aligned approximately parallel with and distal from the first channel;
a second clamping plate having a second length and a second pair of opposed edges, wherein the second clamping plate further comprises
a first channel approximately parallel with the second pair of opposed edges and corresponding to the first channel of the first clamping plate, and
a first plurality of apertures aligned approximately parallel with and proximal to the first channel of the second clamping plate and corresponding to the first plurality of apertures of the first clamping plate; and
at least one securing structure which engages at least one pair of apertures of the first plurality of apertures of the first clamping plate and the first plurality of apertures of the second clamping plate,
wherein the first channels of the first and second clamping plates together form a first tubular channel; and
at least two tension-applying structures,
wherein the first tubular component is secured in between the first and second clamping plates at the first channels of the first and second clamping plates,
wherein the second tubular component is secured in the second channel of the first clamping plate, and
wherein each of the at least two tension-applying structures is secured to the second tubular component at a respective one of the openings of the second channel of the first clamping plate.

19. A temporary structure sheet clamp comprising:
a first clamping plate having a first length and a first pair of opposed edges, wherein the first clamping plate further comprises
a first channel approximately parallel with the pair of opposed edges and proximal to a first of the opposed edges,
a second channel approximately parallel with the first pair of opposed edges and proximal to a second of the first pair of opposed edges, wherein the second channel has a length and is formed from a plurality of hook-shaped structures and a plurality of openings, wherein each of the plurality of hook-shaped structures includes a first hook end which is a free end and a second hook end which is secured with the first clamp plate, and wherein each of the plurality of hook-shaped structures is separated from an adjacent one of the hook-shaped structures by one of the plurality of openings,
a first plurality of apertures aligned approximately parallel with and proximal to the first channel, and
a second plurality of apertures aligned approximately parallel with and distal from the first channel, wherein each of the apertures of the second plurality of apertures has a corresponding opening in one of the plurality of hook-shaped structures;
a second clamping plate having a second length and a second pair of opposed edges, wherein the second clamping plate further comprises
a first channel approximately parallel with the second pair of opposed edges and corresponding to the first channel of the first clamping plate, and
a first plurality of apertures aligned approximately parallel with and proximal to the first channel of the second clamping plate and corresponding to the first plurality of apertures of the first clamping plate; and at least one securing structure which engages at least one pair of apertures of the first plurality of apertures of the first clamping plate and the first plurality of apertures of the second clamping plate, wherein the first channels of the first and second clamping plates together form a first tubular channel.

20. A temporary structure sheet clamp comprising:

a first clamping plate having a first length and a first pair of opposed edges, wherein the first clamping plate further comprises
- a first channel approximately parallel with the pair of opposed edges and proximal to a first of the opposed edges,
- a second channel approximately parallel with the first pair of opposed edges and proximal to a second of the first pair of opposed edges, wherein the second channel has a length and is formed from a plurality of hook-shaped structures and a plurality of openings, wherein each of the plurality of hook-shaped structures is separated from an adjacent one of the hook-shaped structures by one of the plurality of openings, and wherein each of the plurality of openings of the second channel has a width from 2 inches to 15 inches as measured along the length of the second channel,
- a first plurality of apertures aligned approximately parallel with and proximal to the first channel, and
- a second plurality of apertures aligned approximately parallel with distal from the first channel;

a second clamping plate having a second length and a second pair of opposed edges, wherein the second clamping plate further comprises
- a first channel approximately parallel with the second pair of opposed edges and corresponding to the first channel of the first clamping plate, and
- a first plurality of apertures aligned approximately parallel with and proximal to the first channel of the second clamping plate and corresponding to the first plurality of apertures of the first clamping plate; and at least one securing structure which engages at least one pair of apertures of the first plurality of apertures of the first clamping plate and the first plurality of apertures of the second clamping plate, wherein the first channels of the first and second clamping plates together form a first tubular channel.

\* \* \* \* \*